(12) United States Patent
Abad et al.

(10) Patent No.: US 11,138,600 B2
(45) Date of Patent: Oct. 5, 2021

(54) SMART CONTRACT REGULATION

(71) Applicant: Capital One Services, LLC, McLean, VA (US)

(72) Inventors: Fardin Abdi Taghi Abad, Champaign, IL (US); Jeremy Goodsitt, Champaign, IL (US); Austin Walters, Savoy, IL (US)

(73) Assignee: Capital One Services, LLC, McLean, VA (US)

(*) Notice: Subject to any disclaimer, the term of this patent is extended or adjusted under 35 U.S.C. 154(b) by 54 days.

(21) Appl. No.: 16/267,838

(22) Filed: Feb. 5, 2019

(65) Prior Publication Data

US 2020/0250663 A1     Aug. 6, 2020

(51) Int. Cl.
G06Q 20/38         (2012.01)
H04L 9/06          (2006.01)

(52) U.S. Cl.
CPC ......... G06Q 20/389 (2013.01); H04L 9/0637 (2013.01); *G06Q 2220/00* (2013.01); *H04L 2209/38* (2013.01)

(58) Field of Classification Search
CPC .............. G06Q 20/389; G06Q 2220/00; H04L 9/0637; H04L 2209/38; H04L 63/00; H04L 9/3239
See application file for complete search history.

(56) References Cited

U.S. PATENT DOCUMENTS

| | | | | |
|---|---|---|---|---|
| 5,884,075 A | * | 3/1999 | Hester | G06F 9/4411 713/100 |
| 2017/0301047 A1 | * | 10/2017 | Brown | G06Q 50/18 |
| 2018/0005186 A1 | * | 1/2018 | Hunn | G06Q 30/0283 |
| 2018/0096360 A1 | * | 4/2018 | Christidis | H04L 9/3239 |
| 2018/0204191 A1 | * | 7/2018 | Wilson | H04L 9/3242 |
| 2019/0165930 A1 | * | 5/2019 | Castinado | H04L 9/3247 |
| 2020/0101367 A1 | * | 4/2020 | Tran | G06F 3/011 |

FOREIGN PATENT DOCUMENTS

| | | |
|---|---|---|
| CN | 107103054 | 8/2017 |
| WO | 2017/098519 | 6/2017 |
| WO | 2017/145019 | 8/2017 |

OTHER PUBLICATIONS

M. Alharby and A. Van Moorsel, "Blockchain-based smart contracts: A systematic mapping study", arXiv preprint, 2017. (Year: 2017).*

* cited by examiner

Primary Examiner — Carrie S Gilkey
(74) Attorney, Agent, or Firm — Harrity & Harrity, LLP

(57) ABSTRACT

A platform may receive a first smart contract. The first smart contract may be associated with an entity that stores a plurality of smart contracts in a distributed ledger. The platform may determine a state of the first smart contract and a state of a second smart contract and compare the state of the first smart contract and the state of the second smart contract. The platform may determine, based on the state of the first smart contract and the state of the second smart contract, that a conflict exists between the first smart contract and the second smart contract. The conflict may be determined based on at least one of the first smart contract or the second smart contract being in violation of a respective term of at least one of the first smart contract or the second smart contract.

20 Claims, 11 Drawing Sheets

500 →

510 — Determine a current state of a first smart contract, wherein the current state of the first smart contract is defined based on a first condition and a variable, wherein the first condition causes, based on the variable, the first smart contract to be compliant or not compliant 520 — Determine, based on determining the current state of the first smart contract, a current state of a second smart contract, wherein the second smart contract is one of a plurality of smart contracts in a distributed ledger, and wherein the current state of the second smart contract is defined based on a second condition and the variable, wherein the second condition causes the second smart contract to be compliant or not compliant based on the variable 530 — Determine, based on the current state of the first smart contract and the current state of the second smart contract, whether the first smart contract conflicts with the second smart contract, wherein the first smart contract conflicts with the second smart contract when the variable causes the first smart contract to be compliant based on the first condition and the second smart contract to not be compliant based on the second condition, or wherein the first smart contract conflicts with the second smart contract when the variable causes the first smart contract to not be compliant based on the first condition and the second smart contract to be compliant based on the second condition 540 — Perform an action based on whether the first smart contract conflicts with the second smart contract

FIG. 5

SMART CONTRACT REGULATION

BACKGROUND

A smart contract is a computer protocol intended to digitally facilitate, verify, or enforce a contract. Smart contracts allow performance of credible transactions without third parties. Such transactions may be trackable and irreversible. A blockchain is a distributed database that maintains a continuously-growing list of records, called blocks, that may be linked together to form a chain. Each block in the blockchain may contain a timestamp and a link to a previous block and/or transaction. The blocks may be secured from tampering and revision. In addition, a blockchain may include a secure transaction ledger database shared by parties participating in an established, distributed network of computers. A blockchain may record a transaction (e.g., an exchange or transfer of information) that occurs in the network, thereby reducing or eliminating the need for trusted/centralized third parties. In some cases, the parties participating in a transaction may not know the identities of any other parties participating in the transaction but may securely exchange information. Further, the distributed ledger may correspond to a record of consensus with a cryptographic audit trail that is maintained and validated by a set of independent computers.

SUMMARY

According to some implementations, a method may include executing a first code associated with a first smart contract, wherein the first code corresponds to a first state machine generated from one or more terms of the first smart contract; determining a state of the first smart contract based on executing the first code associated with the first smart contract, wherein the state of the first smart contract is one state of a plurality of states of the first state machine; executing a second code associated with a second smart contract, wherein the second code corresponds to a second state machine stored in a distributed ledger; determining a state of the second smart contract based on executing the second code associated with the second smart contract, wherein the state of the second smart contract is one state of a plurality of states of the second state machine; determining, based on the state of the first smart contract and the state of the second smart contract, whether a conflict exists between the first smart contract and the second smart contract, wherein a conflict exists between the first smart contract and the second smart contract if the state of the first smart contract violates the state of the second smart contract or the state of the second smart contract violates the state of the first smart contract; and performing an action based on whether a conflict exists between the first smart contract and the second smart contract.

According to some implementations, a device may include one or more memories; and one or more processors, communicatively coupled to the one or more memories, to: determine a current state of a first smart contract, wherein the current state of the first smart contract is defined based on a first condition and a variable, wherein the first condition causes, based on the variable, the first smart contract to be compliant or not compliant; determine, based on determining the current state of the first smart contract, a current state of a second smart contract, wherein the second smart contract is one of a plurality of smart contracts in a distributed ledger, and wherein the current state of the second smart contract is defined based on a second condition and the variable, wherein the second condition causes the second smart contract to be compliant or not compliant based on the variable; determine, based on the current state of the first smart contract and the current state of the second smart contract, whether the first smart contract conflicts with the second smart contract, wherein the first smart contract conflicts with the second smart contract when the variable causes the first smart contract to be compliant based on the first condition and the second smart contract to not be compliant based on the second condition, or wherein the first smart contract conflicts with the second smart contract when the variable causes the first smart contract to not be compliant based on the first condition and the second smart contract to be compliant based on the second condition; and perform an action based on whether the first smart contract conflicts with the second smart contract.

According to some implementations, a non-transitory computer-readable medium may store instructions that, when executed by one or more processors, cause the one or more processors to: receive a first smart contract, wherein the first smart contract is associated with an entity that stores a plurality of smart contracts in a distributed ledger; determine a state of the first smart contract; determine a state of a second smart contract, wherein the second smart contract is one of the plurality of smart contracts; compare the state of the first smart contract and the state of the second smart contract; determine, based on the state of the first smart contract and the state of the second smart contract, that a conflict exists between the first smart contract and the second smart contract, wherein the conflict is determined based on at least one of the first smart contract or the second smart contract being in violation of a respective term of at least one of the first smart contract or the second smart contract; and prevent the first smart contract from being added to the distributed ledger based on determining that the conflict exists between the first smart contract and the second smart contract.

BRIEF DESCRIPTION OF THE DRAWINGS

FIGS. 4-6 are flow charts of example processes associated with smart contract regulation.

DETAILED DESCRIPTION

Figure 1A:
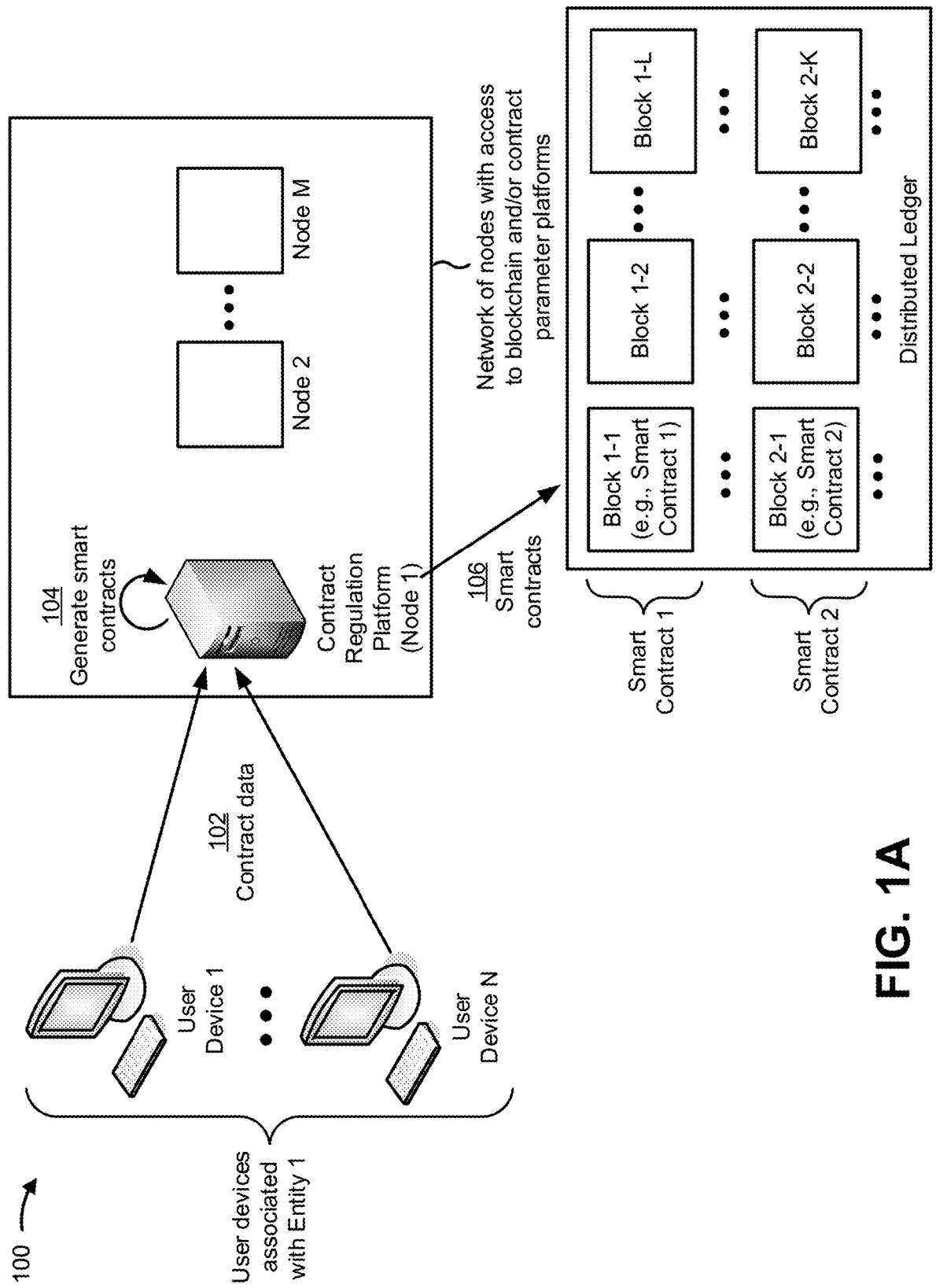
FIGS. 1A-1F are diagrams of an example implementation described herein.

The following detailed description of example implementations refers to the accompanying drawings. The same reference numbers in different drawings may identify the same or similar elements.

In many instances, an entity (e.g., an individual and/or organization) engages in a new agreement and/or implements a new policy (e.g., guidelines, rules, and/or the like) that are to be followed by the entity and/or representatives of the entity). Furthermore, the entity might follow and/or abide by a plurality of regulations (or laws) (e.g., government regulations, industry standard regulations, association regulations, and/or the like), and/or the like. Such agreements, policies, regulations and/or the like are considered herein to be "contracts" that involve the entity. Such contracts may define relationships, transactions, and/or agreements between the entity and one or more parties (e.g., customers, business partners, employees, governments, associations, and/or the like). Over time, the entity may become involved in and/or be associated with hundreds, thousands, or millions of contracts associated with hundreds, thousands, or millions of parties. A breach of a contract (e.g., a break in an agreement, a violation of a policy, a violation of a regulation (or law), and/or the like) can be extremely costly to the entity depending on the severity of the breach and/or any penalties that may be enforced against the entity for such breaches. Furthermore, if one or more contracts involving the entity conflict with another contract and/or are capable of conflicting with another contract, the entity may be forced to breach one of the contracts.

Accordingly, the entity may attempt to manage and/or regulate any contracts involving the entity (e.g., via auditing, and/or other types of processes). In some cases, to ensure that contracts involving an entity do not conflict with each other (including agreements with one or more third parties conflicting with each other, agreements conflicting with one or more policies, agreements and/or policies conflicting with any laws or regulations, and/or the like), the entity may employ one or more human actors (e.g., accountants, attorneys, and/or the like) to constantly review new potential contracts and/or active contracts that involve the entity. Using such human actors to review and/or interact with such a large amount of information is expensive, and subjects such contract management processes and/or auditing processes to human error and/or subjectivity. Furthermore, such human errors and/or subjectivity leads to wasting computing resources (e.g., memory resources and/or processing resources) and/or network resources used by the human actors efficiently managing and/or regulating the contracts. Moreover, such reviews can be relatively slow processes that take weeks, months, or more, thus delaying engagement in new contracts, detection of conflicts, enforcement of the contracts (e.g., due to expiration of terms of the contracts), and/or the like. Previous techniques to manage and/or regulate contracts associated with an entity involve electronically maintaining documents, spreadsheets, and/or the like associated with contracts that may be searchable, reviewable, and/or the like. However, such previous techniques involve several technical problems such as ensuring that the contracts are secure (e.g., information, agreements, terms, and/or the like of the contract are kept confidential between the parties), accessible (e.g., that the contracts are transparent and available to the parties involved in the contracts), maintained (e.g., validly updated, stored, legally recorded, and/or the like), and/or the like.

According to some implementations described herein, a contract (e.g., an agreement, a policy, regulation/law, and/or the like) may be expressed as and/or configured as a smart contract. For example, the smart contract may be configured as a state machine that has states defined by terms of the contract. In some implementations, one or more contract documents may be analyzed (e.g., using an optical character recognition technique, a text recognition technique, a natural language processing analysis, and/or the like) to automatically generate a smart contract corresponding to the contract.

As described herein, a smart contract may be executed to determine a state of a corresponding contract, policy, regulation, and/or the like. For example, one or more inputs associated with terms of a contract (e.g., variables, conditions, and/or the like) may be fed into a corresponding smart contract, and an output of the smart contract may be the state of the contract. Such states may indicate whether one or more parties breached or violated terms of a contract (e.g., an agreement, policy, regulation, and/or the like), may indicate that one or more parties are in a particular stage of a process laid out in the contract, whether one or more parties have engaged in any activities associated with the contract (e.g., provided a service, provided a payment, satisfied a condition, and/or the like), and/or the like. In some implementations, a smart contract can be used to determine a validity of a contract and/or an enforceability of the contract. For example, a smart contract, generated in association with a contract, can be analyzed to determine that one or more states of the contract may conflict with one another and/or are not possible. Accordingly, conflicts between terms of a contract can automatically be detected and/or determined to be enforceable using smart contracts, as described herein.

In some implementations, the contract regulation platform may utilize information received from one or more contract status platforms that may provide information associated with a status of a contract. Such contract status platforms may include one or more general information platforms, one or more platforms associated with a party of a contract, and/or the like. As described herein, the received information may correspond to inputs or variables of a smart contract. Such inputs or variables may correspond to one or more terms, phrases, or conditionals of a corresponding contract. For example, if a contract includes a provision that a transaction should occur within a specified time period, the contract regulation platform may obtain current time information and/or timestamps associated with any transactions involving the contract, as indicated by the contract status platforms. In such cases, the in current time information and/or timestamps may be considered as inputs or variables of the smart contract and/or conditionals of the contract. Accordingly, the contract regulation platform may insert the current time information and/or timestamps into the smart contract to determine the state of the smart contract (e.g., to determine whether there was a breach of the contract associated with the timing of the transaction). In this way, the contract regulation platform may utilize information, obtained from one or more contract status platforms, associated with terms of the contract to determine one or more of the states of the smart contract.

Furthermore, according to some implementations described herein, a contract regulation platform may manage (e.g., store, update, maintain, and/or the like) a plurality of smart contracts (e.g., smart contracts, involving one or more entities, that correspond to enforceable agreements, policies, regulations and/or the like) to automatically regulate (e.g., control enforcement, control authorization, validate, and/or the like) the plurality of smart contracts (e.g., according to terms of corresponding contracts). In some implementations, the contract regulation platform may analyze any newly received contracts (e.g., contracts associated with an entity) to determine whether such newly received contracts conflict or may conflict with any of the plurality of managed smart contracts. In such cases, if a conflict exists, the newly received contract may be invalidated, deemed to be unenforceable (e.g., until any conflict is resolved), and/or the like. In this way, the contract regulation platform may automatically determine whether any conflicts exist or can potentially exist between two contracts (or more), by executing two corresponding smart contracts to determine one or more states (e.g., current states or potential states) of each of the smart contracts, comparing the states of each of the smart contracts, and identifying whether a conflict exists or may exist between any of the states of the smart contracts.

As described herein, the contract regulation platform may manage smart contracts using a distributed ledger. According to some implementations, the distributed ledger may enable a network of nodes, that have access to the distributed ledger, to access the smart contracts. The network of nodes may correspond to one or more devices associated with an entity (e.g., devices owned, operated, and/or maintained by the entity), one or more parties involved in one or more of the smart contracts, or simply one or more devices that are authorized to access or a capable of accessing the distributed ledger (e.g., if the distributed ledger is publicly available). In some implementations, the network of nodes may have various levels of access capabilities that may permit the network of nodes to view (e.g., read the distributed ledger) and/or update (e.g., write to the distributed ledger) a smart contract in the distributed ledger. In this way, the contract regulation platform provides accessibility (e.g., to any authorized party, from any device capable of accessing the distributed ledger, regardless of time, location, and/or the like) to contracts associated with the smart contracts in the distributed ledger.

Furthermore, the contract regulation platform may use the distributed ledger to secure the smart contracts. For example, the distributed ledger may be immutable, such that no party or entity can edit, revise, and/or update an entry in the distributed ledger. For example, the distributed ledger may be a blockchain. In such cases, a smart contract may be implemented via a plurality of blocks linked together in the blockchain. For example, a new block may be added to the blockchain for a smart contract when terms of a contract, associated with the smart contract, are updated. In this way, smart contracts (and/or corresponding contracts) can be secured in the distributed ledger while providing transparency of a history of the contract.

In some implementations, the distributed ledger may store hundreds, thousands, millions, or more smart contracts associated with hundreds, thousands, millions, or more contracts, associated with an entity, that may involve different terms, parties, and/or the like. Additionally, or alternatively, the distributed ledger may store hundreds, thousands, millions, or more smart contracts associated with hundreds, thousands, millions, or more contracts that are associated with hundreds, millions, or more entities. As described herein, the contract regulation platform may process hundreds, thousands, millions, or more smart contracts (e.g., corresponding to newly received contracts and/or contracts in the distributed ledger). In this way, the contract regulation platform, using the distributed ledger, enables management and/or regulation of a plurality of contracts, regardless of the quantity of the plurality of contracts.

Accordingly, as described herein, using a distributed ledger, the contract regulation platform may determine whether one or more of the smart contracts conflict with one another (e.g., whether one or more states or potential states of the smart contracts conflict with each other or may conflict with each other). In some implementations, the contract regulation platform may receive a smart contract, determine a state of the smart contract (e.g., by executing code associated with the smart contract), compare the state of the smart contract with that of another smart contract (or a plurality of other smart contracts) (e.g., by executing code associated with the other smart contract), and determine whether a conflict (or potential conflict) exists between the smart contracts. Such conflicts may indicate a likelihood of a breach in one or more agreements, a violation of one or more policies, a violation of one or more regulations, and/or the like.

In this way, several different stages of the process for regulating contracts associated with one or more entities are automated, which may remove human subjectivity and waste from the process, and which may improve speed and efficiency of the process and conserve computing resources (e.g., processor resources, memory resources, and/or the like). Furthermore, some implementations described herein use a rigorous, computerized process to perform tasks or roles that were not previously performed. For example, previously, a technique did not exist to receive a smart contract associated with a contract involving an entity, determine a state of the contract by executing code associated with the smart contract (e.g., a state machine), determining a state of another contract by executing a smart contract associated with the other contract, determining whether a conflict exists between the contract and the other contract based on comparing the determined states of the smart contracts, and performing an action associated with at least one of the smart contracts based on whether a conflict exists between the contracts (e.g., invalidating at least one of the contracts, preventing one of the contracts from being enforced, preventing the received smart contract from being added to a distributed ledger, and/or the like). Furthermore, automating the process for regulating contracts, as described herein, conserves computing resources (e.g., processor resources, memory resources, and/or the like) and/or network resources that would otherwise be wasted in attempting to search for contracts, navigate to contracts, review terms of contracts, and/or the like.

FIGS. 1A-1F are diagrams of an example implementation 100 described herein. Example implementation 100 may include one or more user devices (shown as User Device 1 through User Device N) (which may be referred to herein individually as a "user device" and collectively as "user devices") associated with an entity (Entity 1), a network of nodes (shown as a contract regulation platform (serving as Node 1), Node 2, . . . , Node M), one or more contract status platforms (referred to herein individually as a "contract status platform" and collectively as "contract status platforms"), and a distributed ledger (e.g., supported by a data structure, such as a blockchain).

Some implementations described herein may refer to receiving, processing, generating, and/or providing information associated with a contract. Such information associated with the contract may include information associated with parties (e.g., individuals and/or organizations) to the contract, and further, personal/organizational information (e.g., identification information, address information, and/or the like) associated with the parties. It should be understood that any use, storage, or availability of the personal information may be subject to consent of individuals associated with the personal information and that the information should be used in a manner that is compliant with applicable laws concerning protection and/or use of personal information. In some implementations, personal information that may be included in contracts may be redacted such that the personal information is not accessible to any third party that is not involved in the contract.

As shown in FIG. 1A, and by reference number 102, one or more of the user devices may generate and/or provide contract data to the contract regulation platform. For example, an individual may interact with a user device to cause the user device to send a contract (and/or a smart contract) to the contract regulation platform. In this case, the individual may be a representative associated with the entity. In some implementations, the entity may be any type of entity, such as a merchant, a service provider, an organization, an association, and/or the like. Furthermore, the contract may be any type of contract, such as an agreement, a policy, a regulation, and/or the like.

The contract data may be associated with a contract that involves the entity. For example, the entity may be one of the parties involved in the contract. The contract data may be a file (e.g., a digital document, an image (e.g., a scanned image of a printed, paper contract), and/or the like) that includes the contract. As described herein, the contract may include one or more terms that are defined by variables, conditions, and/or the like.

In this way, the contract regulation platform may receive contract data associated with a contract to permit the contract regulation platform to generate a smart contract that corresponds to the contract.

As further shown in FIG. 1A, and by reference number 104, the contract regulation platform may generate a smart contract. For example, the contract regulation platform may generate a smart contract corresponding to a contract associated with the received contract data. In some implementations, the contract regulation platform may generate a smart contract that corresponds to a contract by identifying one or more terms of the contract. The contract regulation platform may use the one or more terms of the contract to define states of the contract. Accordingly, from the determined states of the contract, a state machine (e.g., generated using state machine language) can be generated to form a smart contract. Such a state machine may be defined by a plurality of conditions and/or variables that permit the state of the smart contract to change according to the conditions and/or variables. For example, if a contract $k_1$ is in state $s_1$ and conditions $c_1$ and $c_2$ are true according to variable vl, the state may change to state $s_2$.

In some implementations, the contract regulation platform may preprocess the contract data to generate a smart contract. For example, the contract regulation platform may perform an image processing technique (e.g., an optical character recognition technique), a natural language processing technique, and/or the like to identify details (e.g., terms) of a contract associated with the contract data. Accordingly, the contract regulation platform may parse natural language descriptions of contracts to identify terms of a contract. For example, the contract regulation platform may obtain contract data identifying, in natural language, a description of variables, conditions, and/or the like of a contract, and may parse the contract data to identify terms of the contract, and/or the like. Accordingly, a smart contract, as described herein, may automatically be generated from natural language associated with a contract.

In some implementations, the received contract data may be smart contract data (e.g., the contract data may be executable code of a smart contract). In such cases, the user device (and/or other device) may have generated the smart contract data from a contract. Therefore, in such cases, the contract regulation platform may generate the smart contract from the smart contract data by assembling the smart contract from the smart contract data (e.g., by compiling and/or building the smart contract from the smart contract data).

In this way, the contract regulation platform may generate a smart contract to permit the contract regulation platform to add the smart contract to the distributed ledger.

As further shown in FIG. 1A, and by reference number 106, the contract regulation platform may provide and/or store the smart contract in the distributed ledger. In some implementations, the distributed ledger is a privately managed distributed ledger that is owned, operated, and/or maintained by Entity 1. Accordingly, in such cases, the contract regulation platform may serve as an internal auditing system that ensures that contracts corresponding to the smart contracts in the distributed ledger are not in conflict with one another and/or are valid. In some implementations, the distributed ledger may be a publicly available distributed ledger that is accessible to any individual and/or device that is capable of communicating with and/or accessing the distributed ledger.

As shown, in example 100, the distributed ledger uses blockchain technology. In such cases, one or more smart contracts may be stored as linked blocks within the blockchain. For example, as shown, block 1-1 to block 1-L may be blocks corresponding to a first smart contract (shown as smart contract 1) and block 2-1 to block 2-K may be blocks corresponding to a second smart contract (shown as smart contract 2). In some implementations, each block of a blockchain of a smart contract may correspond to an update and/or adjustment to the smart contract. Additionally, or alternatively, each block of a blockchain for a smart contract may correspond to a transaction associated with a contract that corresponds to the smart contract.

In some implementations, the contract regulation platform may validate the smart contracts. For example, the contract regulation platform may provide one or more of the smart contracts to a validation entity associated with the distributed ledger. In such cases, the validation entity may be used to independently validate and/or verify whether the smart contract is in compliance with rules or protocols used within the distributed ledger. Additionally, or alternatively, the contract regulation platform may analyze the smart contract prior to adding the smart contract to the distributed ledger to ensure that the smart contract is valid (e.g., enforceable) according to the terms of a contract associated with the smart contract. For example, if one or more states of the smart contract cannot be reached according to terms of a contract, and/or one or more states of the smart contract conflict with another state of the smart contract, the contract regulation platform may determine that the contract associated with the smart contract is invalid and/or unenforceable. In such cases, the contract regulation platform may not include the smart contract corresponding to the invalid contract within the distributed ledger. On the other hand, the contract regulation platform may create a blockchain for the smart contract within the distributed ledger, even though the smart contract may not be enforced (e.g., one or more funds and/or values associated with an entity of the smart contract may be frozen and/or held) until the conflict is resolved.

In this way, the contract regulation platform may generate one or more smart contracts based on received contract data and store and/or maintain the one or more smart contracts in a distributed ledger.

Figure 1B:
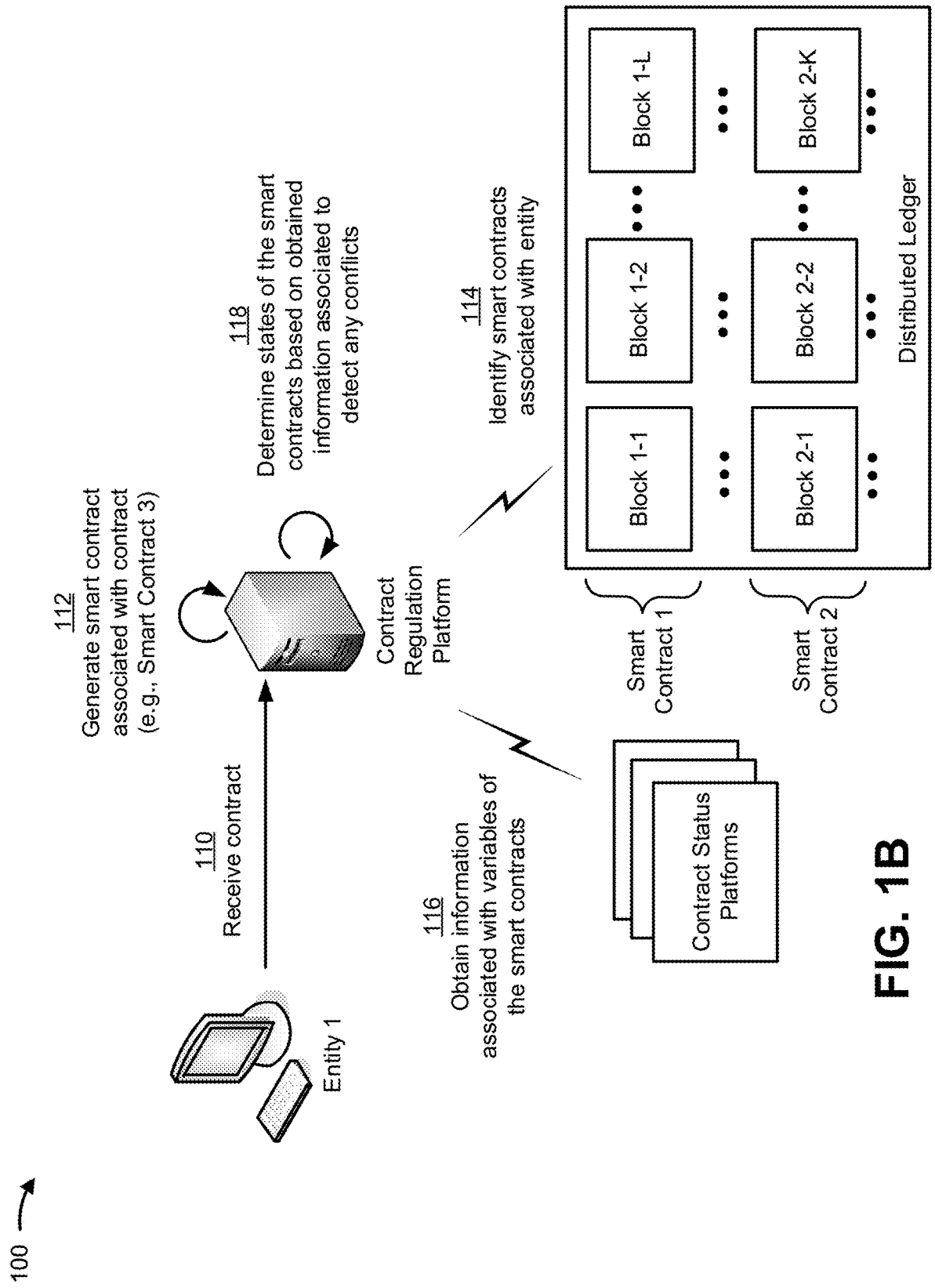

As shown in FIG. 1B, and by reference number 110, the contract regulation platform receives a contract from Entity 1, as described herein. The contract may be a document that includes text of the contract, an image of a contract that includes text of the contract, and/or the like. The contract may be a newly received contract that is not associated with any contract that is stored in the distributed ledger, such as a newly received agreement involving Entity 1, a newly received policy of Entity 1, and/or a newly received regulation that Entity 1 is to follow. In the following example, the contract may be a contract that is to be stored and/or maintained within the distributed ledger to permit the contract regulation platform to regulate the contract and/or one or more other contracts according to the contract (e.g., by controlling enforcement of the one or more other contracts based on whether there is a conflict with the contract).

In some implementations, the received contract may be related to one or more contracts (e.g., smart contract 1 and/or smart contract 2) in the distributed ledger. In such cases, a smart contract generated in association with the received contract may be stored (e.g., depending on results of an analysis of the smart contract) as a block in a blockchain of the distributed ledger that is linked to one or more other blocks of the distributed ledger to indicate the relationship of the contract to the one or more other contracts in the distributed ledger.

In this way, the contract regulation platform may receive, from Entity 1, a new contract and/or a contract that is to be monitored, maintained, and/or regulated as described herein.

As further shown in FIG. 1B, and by reference number 112, the contract regulation platform generates a smart contract corresponding to the received contract, as described herein. The generated smart contract for the received contract (which may be a newly received contract or a contract that is not associated with any contract that is stored in the distributed ledger) is referred to as smart contract 3 in example implementation 100.

As further shown in FIG. 1B, and by reference number 114, the contract regulation platform identifies smart contracts in the distributed ledger that are associated with Entity 1. The contract regulation platform may identify those smart contracts in the distributed ledger that may be associated with the received contract to determine whether the received contract conflicts with any of the smart contracts in the distributed ledger. For example, based on an identifier (e.g., a name, a number, a source identifier, an address, and/or the like) of the received contract, the contract regulation platform may identify any other smart contracts in the distributed ledger that are also associated with Entity 1. In this way, if the distributed ledger is a publicly available and/or a publicly managed distributed ledger that includes smart contracts associated with several entities, the contract regulation platform may perform a search of the distributed ledger to find the smart contracts that involve Entity 1. Although, in one or more of the examples described herein, Entity 1 may be associated with smart contract 1 and/or smart contract 2, Entity 1 may be associated with one or more other smart contracts in the distributed ledger.

In some implementations, if the distributed ledger is a privately available and/or privately managed distributed ledger that is owned, operated, and/or maintained by Entity 1, the contract regulation platform may identify and/or access all smart contracts in the distributed ledger. For example, the contract regulation platform may scan and/or access any and/or all smart contracts that include the identifier that is associated with Entity 1. In some implementations, if the distributed ledger is privately managed in association with Entity 1, the contract regulation platform may identify and/or access the smart contracts that involve one or more of the same parties that are associated with the newly received contract (corresponding to smart contract 3).

In this way, the contract regulation platform may identify smart contracts in the distributed ledger that are associated with Entity 1 and/or that may be deemed to potentially conflict with the received contract based on any relationship between the newly received contract and the remaining contracts of the distributed ledger.

As further shown in FIG. 1B, and by reference number 116, the contract regulation platform may obtain, from one or more of the contract status platforms, information associated with terms of the received contract. Further, such information may correspond to inputs that are to be fed into the smart contracts in the distributed ledger (e.g., smart contract 1, smart contract 2, and/or the like) and/or a newly received smart contract that is being analyzed by the contract regulation platform (e.g., smart contract 3, and/or the like). For example, the information may include timing information, currency information, market information, transaction information, and/or any type of information that may affect a state of the contract and/or corresponding smart contracts of the distributed ledger.

In some implementations, the contract regulation platform may obtain the information based on receiving the contract from Entity 1. Additionally, or alternatively, the contract regulation platform may periodically (e.g., according to a schedule) obtain information from the contract status platform to determine one or more states of one or more of the smart contracts in the distributed ledger. In this way, the contract regulation platform may periodically or aperiodically (e.g., based on an event, such as receiving the contract from Entity 1), obtain information to determine the states of one or more smart contracts to determine whether there are any conflicts between any of the smart contracts.

In some implementations, the contract regulation platform may use a machine learning model, such as an information identification model, to identify, select, and/or obtain appropriate information from the contract status platforms in order to permit the contract regulation platform to determine the states of the smart contracts. For example, the contract regulation platform may train the information identification model based on one or more parameters associated with identifying, selecting, and/or obtaining information to determine a state of a contract, such as types of variables of the smart contracts, types of conditions of the smart contracts, one or more characteristics of parties of the smart contracts, whether or not the smart contract is associated with Entity 1, and/or the like. The contract regulation platform may train the information identification model using historical data associated with obtaining information associated with smart contracts (e.g., any of the smart contracts in the distributed ledger, any other smart contracts, and/or the like) according to the one or more parameters. Using the historical data and the one or more parameters as inputs to the information identification model, the contract regulation platform may identify, select, and/or obtain appropriate information associated with the smart contracts in order to permit the contract regulation platform to determine the states of the smart contracts. Furthermore, the obtained information from the contract status platforms may enable the contract regulation platform to determine whether one or more of the smart contracts in the distributed ledger conflicts with the received contract and/or whether two or more of the smart contracts conflict with one another.

In this way, the contract regulation platform may obtain information that permits the contract regulation platform to determine states of smart contracts and determine whether there are any conflicts between the smart contracts.

As further shown in FIG. 1B, and by reference number 118, the contract regulation platform may determine the states of the smart contracts based on the obtained information, in order to detect any conflicts between any of the smart contracts. As described herein, the contract regulation platform may determine the states of the smart contracts by executing code associated with each of the smart contracts using the obtained information as input to the smart contracts. Accordingly, the contract regulation platform may execute code (e.g., code representative of a state machine corresponding to the smart contract) associated with each of the smart contracts that are stored in the distributed ledger (or at least each of the smart contracts that are associated with Entity 1) to identify and/or determine states of the smart contracts. As described herein, the determined states of the smart contracts may correspond to current states of the smart contracts (which may correspond to a current state of the contract corresponding to the smart contract) and/or a potential state of the smart contracts (which may eventually be a state of a contract corresponding to the smart contract). Furthermore, the determined conflicts may correspond to current conflicts between current states of the smart contracts and/or potential conflicts between current states and/or potential states of the smart contracts.

As described herein, a conflict may exist between contracts if states of corresponding smart contracts conflict with one another. For example, the received contract (corresponding to smart contract 3) may conflict with a contract associated with one of the smart contracts in the distributed ledger, say smart contract 1, if, based on the obtained information, a state of smart contract 3 causes a state of smart contract 1 to be become non-compliant and/or invalid. As described herein, the state of a smart contract may not be compliant and/or may be invalid if the smart contract cannot be in that state according to a certain set of inputs. Therefore, if obtained information (and/or potentially obtained information) causes smart contract 3 to be in a state that would render a state of smart contract 1 to become non-compliant, contracts associated with smart contract 1 and smart contract 3 may be determined to be in conflict.

Therefore, a state of a first smart contract may conflict with a state of a second smart contract if the state of the first smart contract is compliant and causes the state of the second smart contract to not be compliant based on a same variable or same input to the smart contracts (e.g., same information from the contract status platform), or vice versa. In other words, the first smart contract may conflict with the second smart contract when obtained information causes the first smart contract to be compliant (e.g., based on a condition of the first smart contract) and the second smart contract to not be compliant (e.g., based on a condition of the second smart contract). Additionally, or alternatively, the first smart contract may conflict with the second smart contract when the variable causes the first smart contract to not be compliant (e.g., based on a condition of the first smart contract) and the second smart contract to be compliant (e.g., based on a condition of the second smart contract).

In some implementations, detecting that a conflict exists between smart contracts may correspond to a probability that a conflict exists and/or a likelihood that a conflict may eventually exist between the smart contracts. In some implementations, the contract regulation platform may use a machine learning model, such as a conflict detection model, to detect a conflict and/or determine a probability that a conflict may exist between smart contracts. For example, the contract regulation platform may train the conflict detection model based on one or more parameters associated with detecting conflicts between smart contracts, such as one or more types of contracts associated with the smart contracts, entities associated with the smart contracts, whether the smart contracts are associated with a same entity, timing associated with the smart contracts, and/or the like. The contract regulation platform may train the conflict detection model using historical data associated with detecting conflicts between smart contracts according to the one or more parameters. Using the historical data and the one or more parameters as inputs to the conflict detection model, the contract regulation platform may determine that a conflict exists and/or does not exist between smart contracts, in order to permit the contract regulation platform to regulate the smart contracts as described herein.

In this way, the contract regulation platform may determine states of the smart contracts to detect any conflicts between the smart contracts in order to permit the contract regulation platform to regulate the one or more contracts associated with the smart contracts accordingly.

Figure 1C:
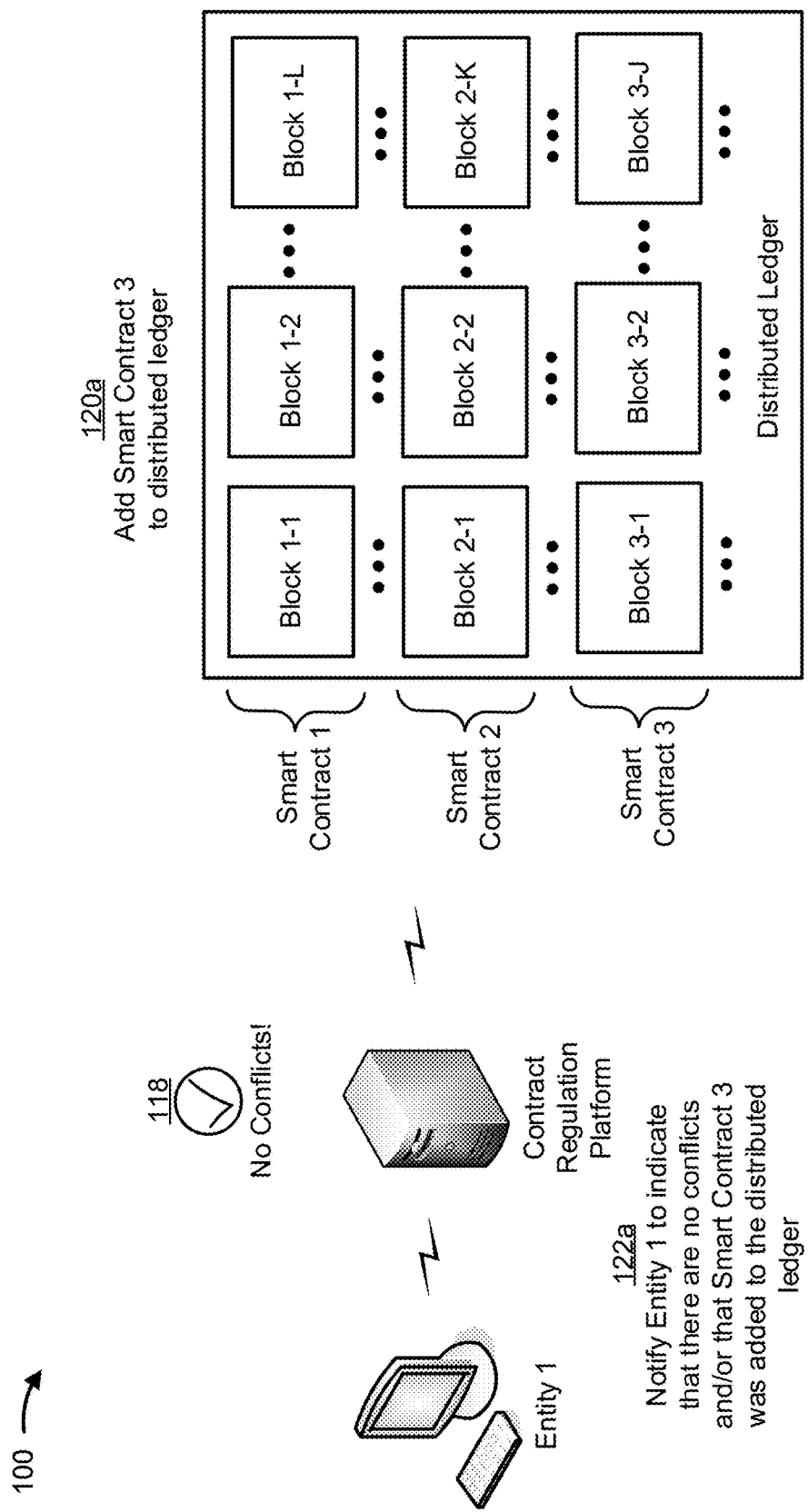

As shown in FIG. 1C, and by reference number 118, the contract regulation platform determines that there are no conflicts involving the received contract (and/or, correspondingly, involving one or more states of smart contract 3). In other words, the contract regulation platform may determine that a conflict does not exist between smart contract 3 and smart contract 1, smart contract 2, or any other smart contract of the distributed ledger. Accordingly, the contract regulation platform may determine that a conflict does not exist between smart contract 3 and any other smart contracts associated with Entity 1.

As further shown in FIG. 1C, and by reference number 120*a*, the contract regulation platform may add smart contract 3 to the distributed ledger. In some implementations, the contract regulation platform may add smart contract 3 to the distributed ledger based on determining that a conflict does not exist in association with smart contract 3. As shown in FIG. 1C, smart contract 3 may be added as a blockchain of one or more of blocks 3-1 to 3-J.

As further shown in FIG. 1C, and by reference number 122*a*, the contract regulation platform may notify Entity 1 to indicate that there are no conflicts between the contract (corresponding to smart contract 3) and any other contract associated with Entity 1. Furthermore, the contract regulation platform may notify Entity 1 to indicate that smart contract 3 has been added to the distributed ledger. Such a notification may indicate, to Entity 1, that the received contract will be regulated and/or monitored by the contract regulation platform as described herein. Additionally, or alternatively, the contract regulation platform may notify Entity 1 that the received contract has been validated and/or approved.

As described herein, the contract regulation platform may notify Entity 1 of any status associated with a regulated contract using any suitable communication protocol and/or any suitable type of message (e.g., an email, a text message, an alert or prompt associated with an application on a user device of Entity 1, and/or the like).

In this way, if a received contract does not conflict with any smart contracts in a distributed ledger and/or any smart contracts associated with Entity 1, the contract regulation platform may enable the contract to be monitored and/or regulated by adding a corresponding smart contract to the distributed ledger.

Figure 1D:
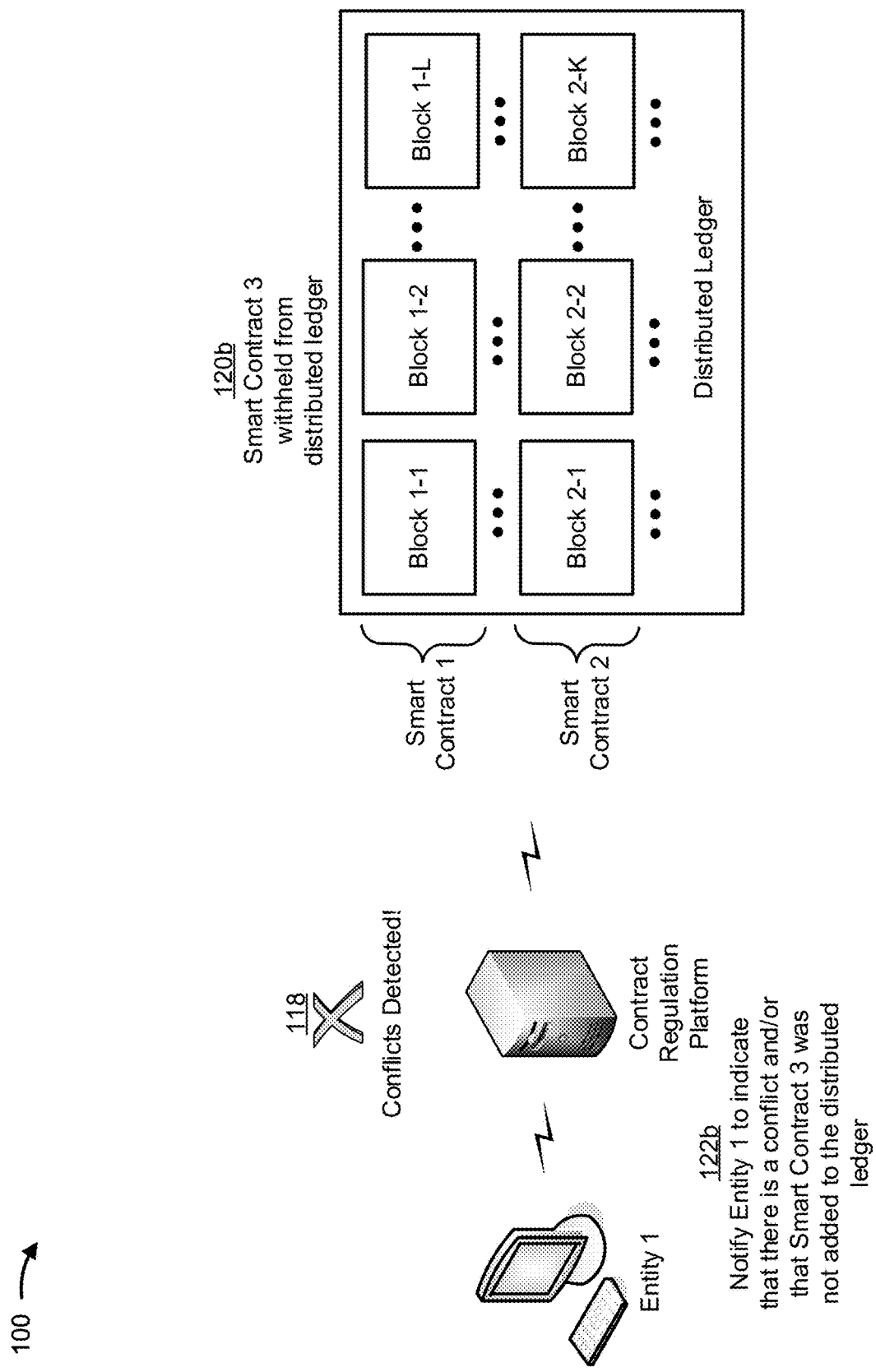

As shown in FIG. 1D, and by reference number 118, the contract regulation platform determines that there are conflicts involving the received contract (and/or, correspondingly, involving one or more states smart contract 3). In other words, the contract regulation platform may determine that a conflict does exist between smart contract 3 and smart contract 1, smart contract 2, or any other smart contract of the distributed ledger. Accordingly, the contract regulation platform may determine that a conflict does exist between smart contract 3 and any other smart contracts associated with Entity 1.

As further shown in FIG. 1D, and by reference number 120*b*, the contract regulation platform may withhold smart contract 3 from the distributed ledger. For example, the contract regulation platform may prevent smart contract 3 from being added to the distributed ledger because there is a conflict between smart contract 3 and one or more of the smart contracts of the distributed ledger. In some implementations, in such cases, the received contract may be a potential contract (e.g., corresponding to a pending agreement between Entity 1 and another party) and Entity 1 submitted the potential contract to the contract regulation platform to confirm and/or verify that the potential contract does not conflict with any other contracts associated with Entity 1.

As further shown in FIG. 1D, and by reference number 122*b*, the contract regulation platform may notify Entity 1 to indicate that there is a conflict. Furthermore, the contract regulation platform may notify Entity 1 to indicate that smart contract 3 was not added to the distributed ledger. Such a notification may indicate that the received contract was not valid relative to the smart contracts of the distributed ledger and/or that the contract regulation platform may not regulate the received contract using smart contract 3 as described herein. Additionally, or alternatively, the contract regulation platform may indicate that the contract is invalid (e.g., based on determining that a state of smart contract 3 conflicting with another state of smart contract 3).

In this way, if a conflict involving the received contract is determined to exist, the contract regulation platform may automatically identify the conflict and notify Entity 1 in order to permit Entity 1 to identify the conflict and address the conflict as necessary (e.g., by revising terms of the contract).

Figure 1E:
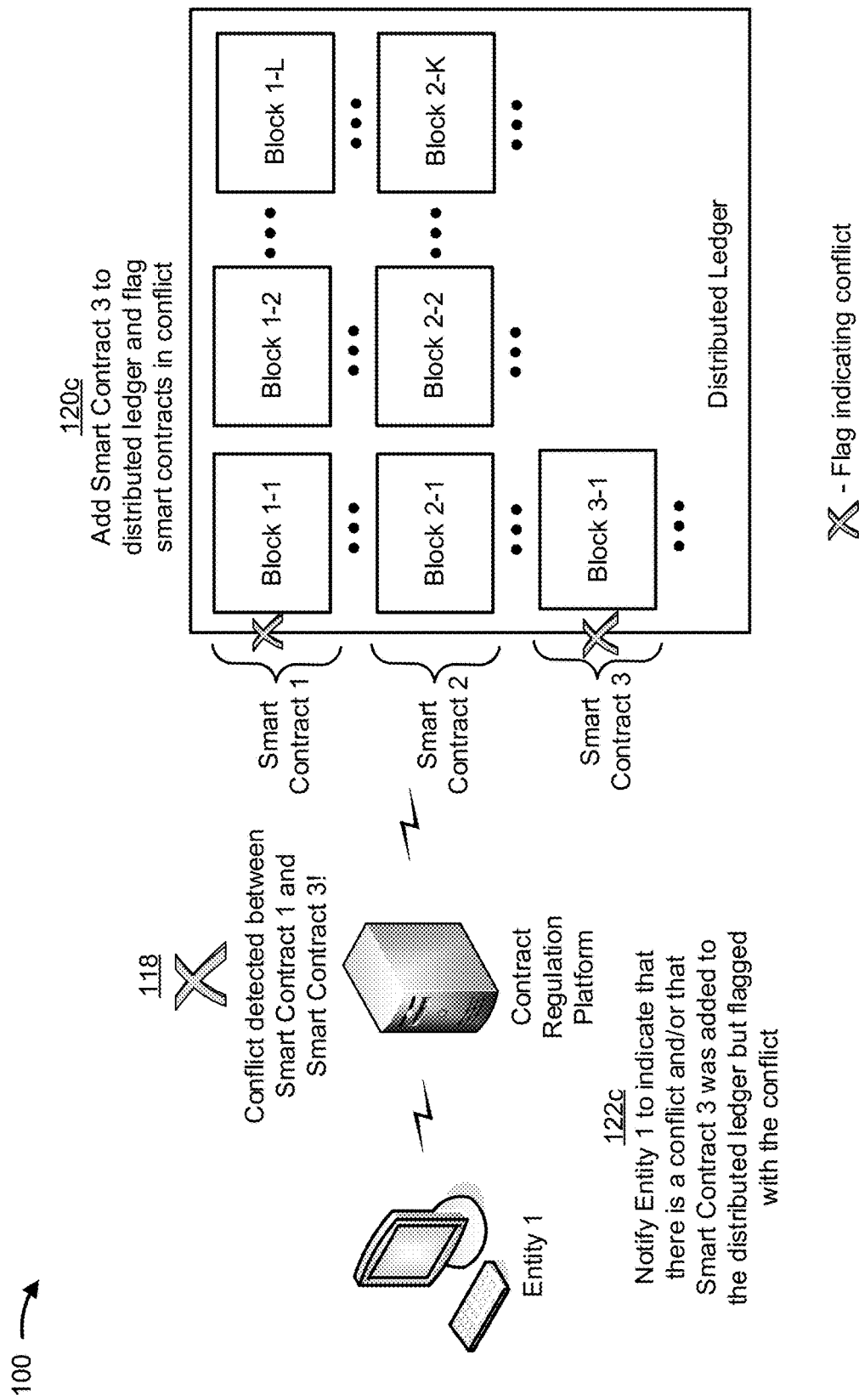

As shown in FIG. 1E, and by reference number 118, the contract regulation platform determines that there is a conflict involving the received contract (and/or, correspondingly, involving one or more states of smart contract 3). Specifically, the contract regulation platform may determine that a conflict does exist between smart contract 3 and smart contract 1.

As further shown in FIG. 1E, and by reference number 120*c*, despite the detected conflict, the contract regulation platform may add smart contract 3 to the distributed ledger. The contract regulation platform may append a flag to smart contract 1 and a flag to smart contract 3 to indicate that there is a conflict involving contracts corresponding to the smart contracts. In some implementations, the conflict flags may be included in a data structure associated with the distributed ledger that indicates information associated with smart contracts in the distributed ledger. In some implementations, the data structure may be implemented by and/or maintained by one of the contract status platforms.

Additionally, or alternatively, the flag may be appended to the smart contract in a block of the smart contract. For example, smart contract 3 may be added as block 3-1 (shown) and a second block 3-2 (not shown) may be added that includes the flag indicating that there is a conflict associated with the contract corresponding to smart contract 3. Furthermore, a block 1-L+1 (not shown) may be added to indicate that there is a conflict associated with the contract corresponding to smart contract 1.

In some implementations, the flag may be a time sensitive flag that permits the smart contract to be included within the distributed ledger for a specified period of time. After the expiration of the threshold period of time, the contract regulation platform may consider the contract to be invalidated and/or expired (e.g., by no longer enabling any blocks associated with revisions to the contract corresponding to smart contract 3 to be added). In this way, the contract regulation platform may enable monitoring of a smart contract 3 that is in conflict with another smart contract for a time period. After the expiration of the time period, any received contract that identifies the previous contract may be considered a new contract, such that a new blockchain for the received contract is formed for the new contract. The contract regulation platform may regulate the received contract using the new blockchain.

As further shown in FIG. 1E, and by reference number 122*c*, the contract regulation platform may notify Entity 1 to indicate that there is a conflict involving the two contracts. More specifically, the contract regulation platform may indicate that there is a conflict between smart contract 1 and smart contract 3. In some implementations, the contract regulation platform may indicate one or more terms of contracts associated with smart contract 1 and smart contract 3 that conflict (e.g., based on the determined states of smart contract 1 and smart contract 3 that conflict). Furthermore, the contract regulation platform may notify Entity 1 to indicate that smart contract 3 was added to the distributed ledger but flagged to indicate the conflict. Such a notification may indicate that the received contract was not valid relative to a contract associated with smart contract 1. In some implementations, the contract regulation platform may regulate smart contract 3 and/or smart contract 1 to prevent any transactions from occurring that involve contracts associated with smart contract 1 and/or smart contract 3 (e.g., using the flags and/or the contract status platforms). In some implementations, the contract regulation platform may prevent funds associated with a value (e.g., a monetary value) of smart contract 1 and/or smart contract 3 to be frozen (e.g., held within a financial account of a financial institution associated with Entity 1 and/or a financial institution associated with contract regulation platform).

In this way, although a conflict may exist between the received contract and a contract associated with one or more smart contracts of the distributed ledger, the contract regulation platform may add smart contract 3 to the distributed ledger to permit the contract regulation platform to manage the contract associated with smart contract 3 once the conflict is resolved.

In some implementations, despite the conflict, contract regulation platform may not flag smart contract 1 and/or smart contract 3 to restrict and/or regulate contracts associated with smart contract 1 or smart contract 3. In such instances, Entity 1 may still enforce (or attempt to enforce) the contracts associated with smart contract 1 and/or smart contract 3 knowing of the potential conflicts. For example, Entity 1 may choose to enforce whichever contract is most beneficial to Entity 1 and/or disregard or attempt to break the contract that is least beneficial to Entity 1 (or, for example, whose breach is least harmful to Entity 1).

Figure 1F:
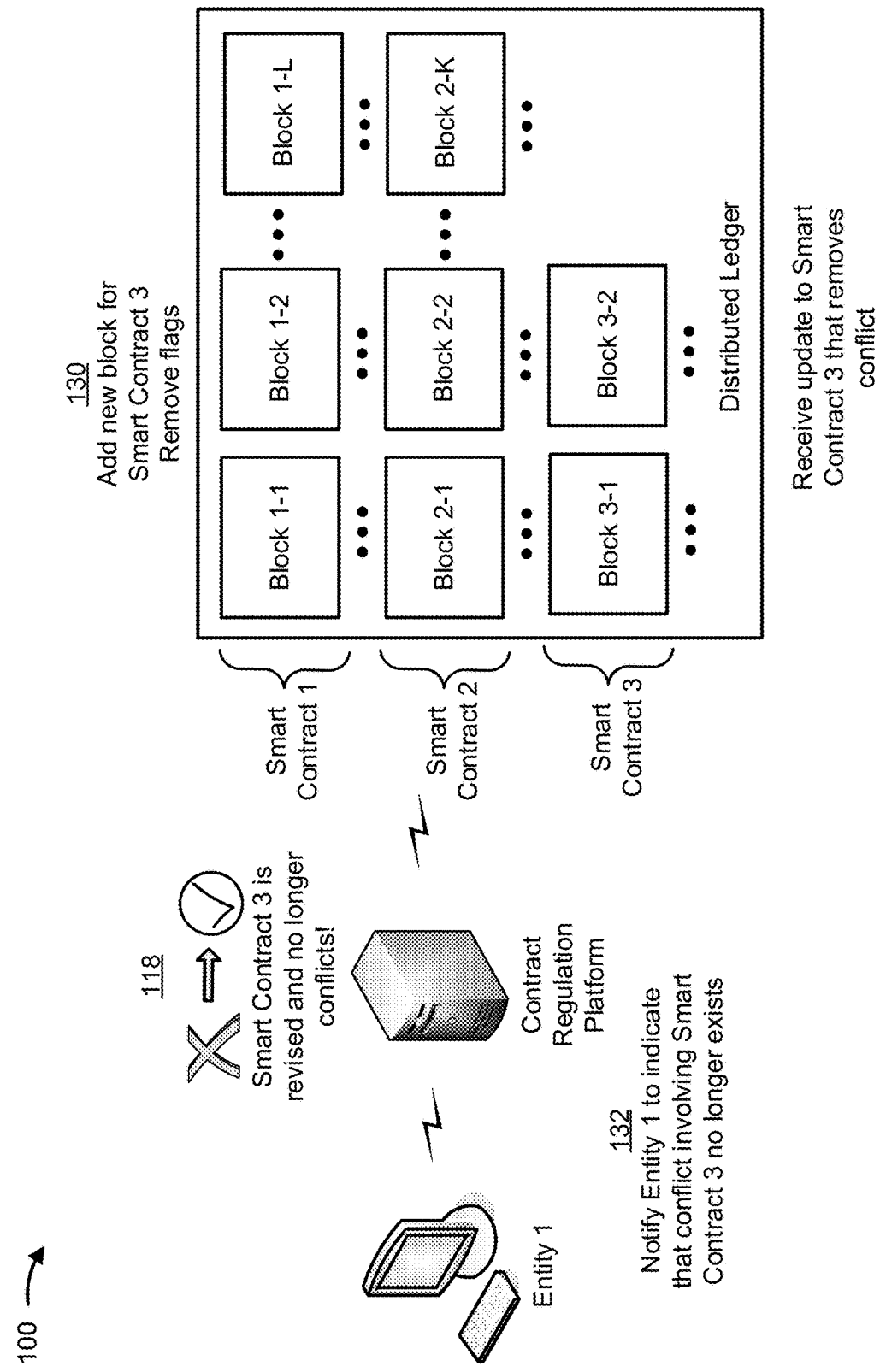

As shown in FIG. 1F, and by reference number 118, the contract regulation platform may determine smart contract 3 has been revised and no longer conflicts with smart contract 1.

As further shown in FIG. 1F, and by reference number 130, the contract regulation platform may add a revised version of smart contract 3 as block 3-2. Additionally, or alternatively, the contract regulation platform may remove any flags appended to smart contract 1 and/or smart contract 3. In this way, the contract regulation platform may no longer prevent any actions associated with smart contract 1 or smart contract 3 (e.g., withholding or freezing funds associated with smart contract 1 or smart contract 3, preventing transactions associated with smart contract 1 and/or smart contract 3, and/or the like).

As further shown in FIG. 1F, and by reference number 132, the contract regulation platform may notify Entity 1 to indicate that the conflict involving smart contract 3 no longer exists. Furthermore, the contract regulation platform may indicate that any restrictions associated with the contract associated with smart contract 3 and/or smart contract 1 have been removed.

In this way, the contract regulation platform may update smart contracts and/or identify that any potential conflicts associated with smart contracts have been removed and/or no longer exist.

As indicated above, FIGS. 1A-1F are provided merely as an example. Other examples may differ from what is described with regard to FIGS. 1A-1F.

Accordingly, as described herein, one or more contracts can be regulated by monitoring one or more states of the contracts and automatically detecting whether a conflict may exist between the one or more contracts (e.g., whether an agreement of one contract may be breached according to terms of another contract, whether a policy may be violated according to terms of a contract, whether a regulation may be violated according to terms of a contract, and/or the like). In this way, several different stages of the process for regulating contracts associated with one or more entities may remove human subjectivity and waste from the process, may improve speed and efficiency of the process, and may conserve computing resources (e.g., processor resources, memory resources, and/or the like) and/or network resources associated with the process. For example, automating the process for regulating contracts, as described herein, may conserve computing resources (e.g., processor resources, memory resources, and/or the like) and/or network resources that would otherwise be wasted in attempting to search for contracts, navigate to contracts, review terms of contracts, compare the terms of the contracts, identify conflicts between the terms of contracts, indicate potential conflicts associated the contracts, prevent enforcement of one or more contracts associated with a conflict, and/or the like.

Figure 2:
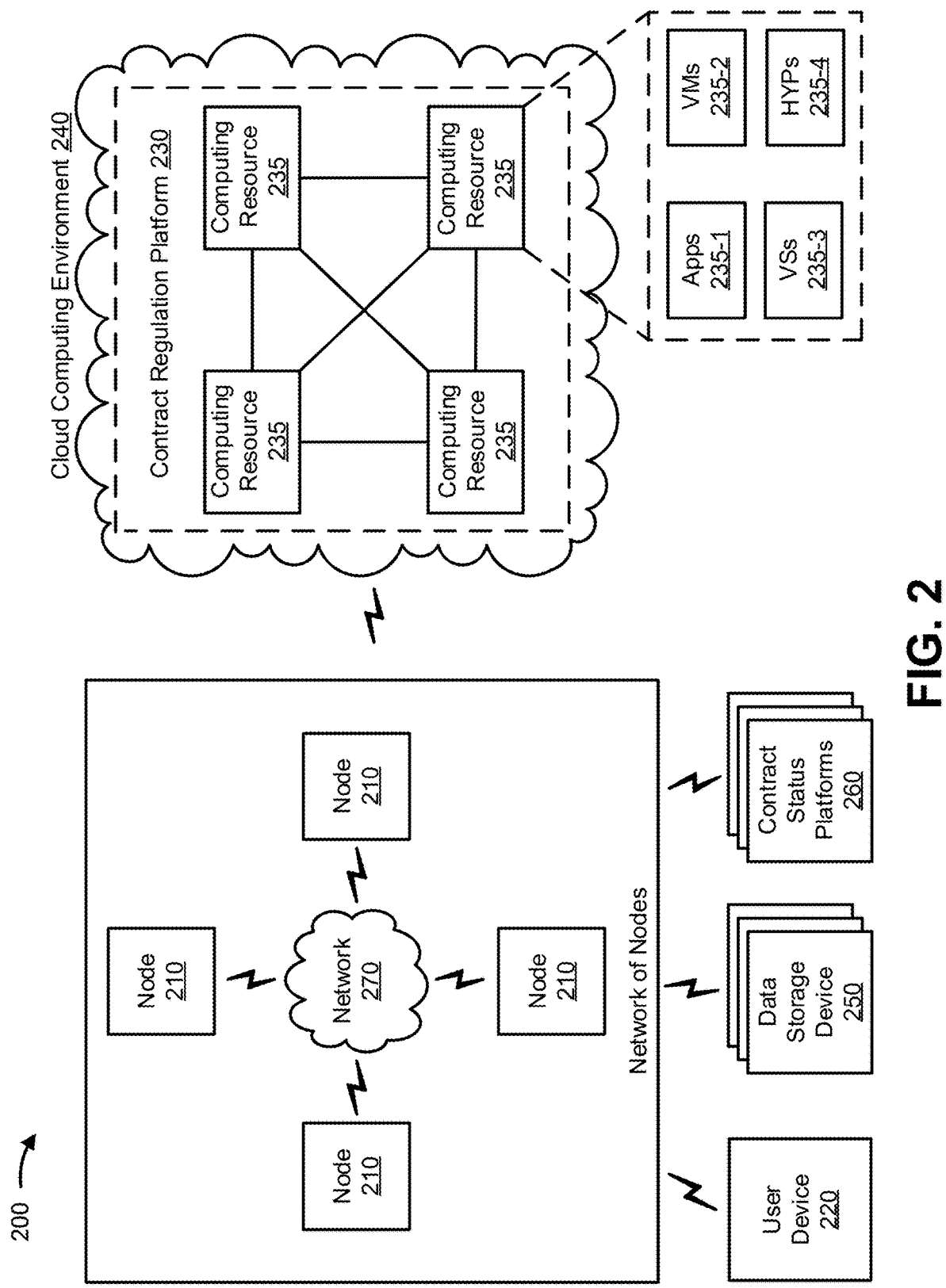
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a node 210, a user device 220, a contract regulation platform 230, a computing resource 235, a cloud computing environment 240, one or more data storage devices 250 (referred to individually as "data storage device 250" and collectively as "data storage devices 250"), one or more contract status platforms 260 (referred to individually as "contract status platform 260" and collectively as "contract status platforms 260"), and a network 270. Devices of environment 200 may interconnect via wired connections, wireless connections, or a combination of wired and wireless connections.

Node 210 includes one or more devices capable of receiving, generating, storing, processing, and/or providing information associated with a contract and/or smart contract. For example, node 210 may include a computing device (e.g., a desktop computer, a laptop computer, a tablet computer, a handheld computer, a server device, etc.), a mobile phone (e.g., a smart phone, a radiotelephone, etc.), or a similar device.

In some implementations, a group of nodes 210 may be part of a network that is able to utilize a distributed ledger and/or contract status platform 260 to regulate contracts as described herein. In some implementations, node 210 may be a device associated with an entity, such as an organization, a subsidiary of the organization, an individual, and/or the like. In some implementations, nodes 210 may be associated with multiple organizations, multiple subsidiaries of an organization, multiple individuals, and/or the like.

User device 220 includes one or more devices capable of receiving, generating, storing, processing, and/or providing information associated with a contract and/or a smart contract. For example, user device 220 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Contract regulation platform 230 includes one or more computing resources assigned to receive, generate, store, process, and/or provide information associated with a contract and/or smart contract. For example, contract regulation platform 230 may be a platform implemented by cloud computing environment 240 that may regulate one or more contracts using smart contracts and a distributed ledger (e.g., stored and/or maintained in data storage device 250), as described herein. In some implementations, contract regulation platform 230 is implemented by computing resources 235 of cloud computing environment 240. Contract regulation platform 230 may include one or more server devices, (e.g., one or more host servers, web servers, application servers, etc.), one or more data center devices, or one or more other similar devices.

In some implementations, contract regulation platform 230 may perform one or more actions described as being performed by node 210. In some implementations, contract regulation platform 230 may serve as a master node or a management node for nodes 210. In some implementations, contract regulation platform may be separate from nodes 210 but may interact with one or more nodes 210. In some implementations, contract regulation platform may generate a smart contract associated with a contract. In some implementations, contract regulation platform 230 may obtain information associated with a contract from contract status platform 260 in order to determine a state of the smart contract. In some implementations, contract regulation platform 230 may determine a state of a smart contract by executing code associated with the smart contract using the information as inputs to the smart contract. In some implementations, contract regulation platform 230 may determine the state of two or more smart contracts to determine whether contracts associated with the smart contracts conflict with each other. In some implementations, contract regulation platform 230 may determine whether a state of a contract corresponds to a contract breaching an agreement, violating a policy, violating a regulation, and/or the like.

In some implementations, contract regulation platform 230 may be hosted in cloud computing environment 240. Notably, while implementations described herein describe contract regulation platform 230 as being hosted in cloud computing environment 240, in some implementations, contract regulation platform 230 may be non-cloud-based or may be partially cloud-based.

Cloud computing environment 240 includes an environment that hosts contract regulation platform 230. Cloud computing environment 240 may provide computation, software, data access, storage, and/or other services that do not require end-user knowledge of a physical location and configuration of a system and/or a device that delivers the services. As shown, cloud computing environment 240 may include contract regulation platform 230 and computing resource 235.

Computing resource 235 includes one or more personal computers, workstation computers, server devices, or another type of computation and/or communication device.

In some implementations, computing resource 235 may host contract regulation platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 220. Application 235-1 may eliminate a need to install and execute the software applications on user device 220. For example, application 235-1 may include software associated with contract regulation platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 220), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Distributed data storage device 250 may include one or more devices capable of receiving, generating, storing, processing, and/or providing information associated with a contract (e.g., a state of the contract, one or more terms of the contract, and/or the like). For example, distributed data storage device 250 may include a computing device, such as a server, a desktop computer, a laptop computer, a tablet computer, a handheld computer, or a similar device. In some implementations, distributed data storage devices 250 may support a distributed ledger that uses a data structure (e.g., a blockchain) to store smart contracts associated with contracts.

Contract status platforms 260 may include a server device (e.g., a host server, a web server, an application server, etc.), a data center device, or a similar device capable of storing, maintaining, and/or providing information associated with a contract. For example, contract status platforms 260 may provide information associated with variables (e.g., inputs) of a smart contract maintained in data storage device 250 to permit a state of a contract to be determined by executing code associated with the smart contract. Contract status platforms 260 may be one or more publicly available contract status platforms, one or more privately available contract status platforms (e.g., a platform associated with and/or operated by an entity and/or one or more parties of the contract), and/or the like.

Network 270 includes one or more wired and/or wireless networks. For example, network 270 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
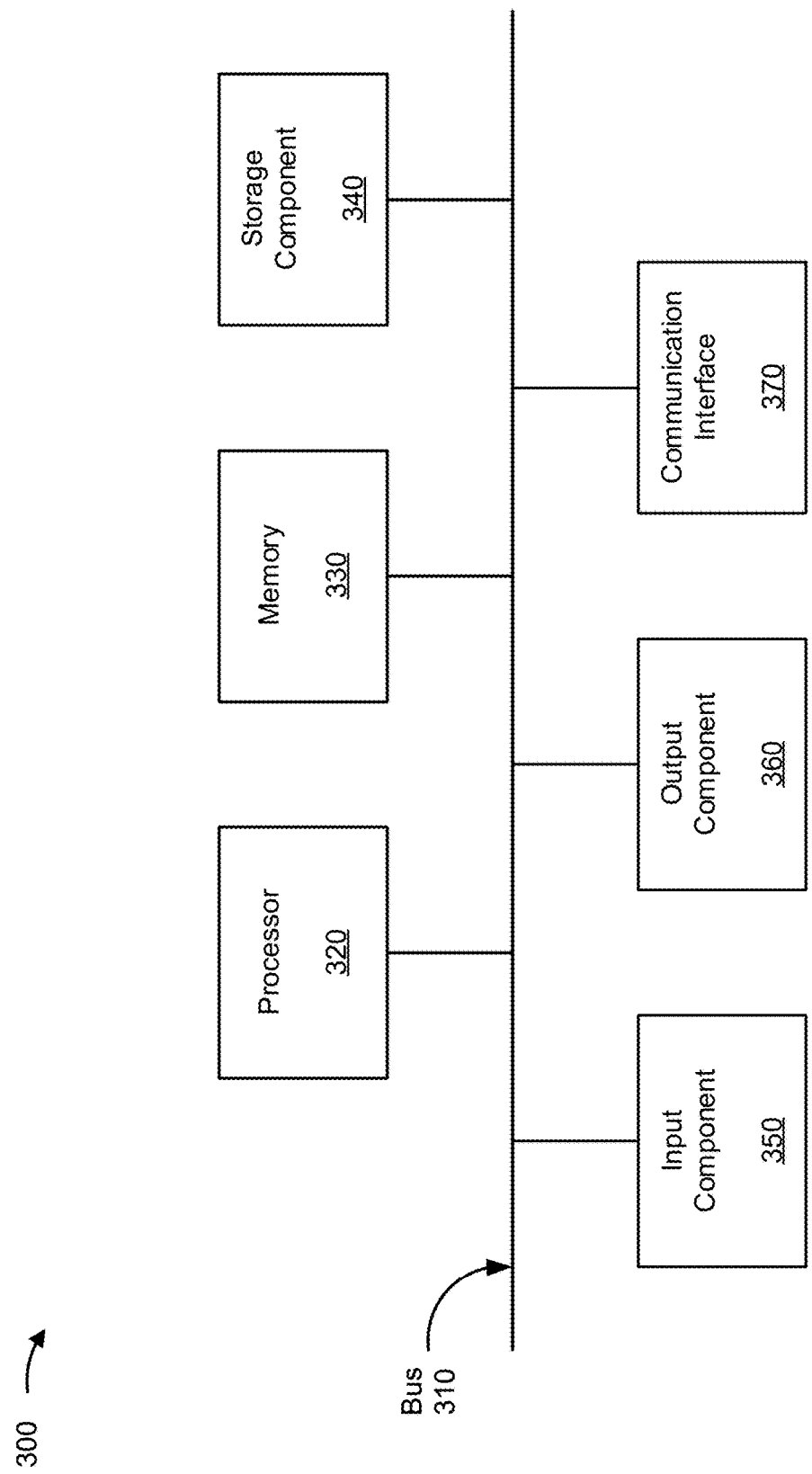
FIG. 3 is a diagram of example components of one or more devices of FIG. 2.

FIG. 3 is a diagram of example components of a device 300. Device 300 may correspond to node 210, user device 220, contract regulation platform 230, computing resource 235, data storage device 250, and/or contract status platforms 260. In some implementations, node 210, user device 220, contract regulation platform 230, computing resource 235, data storage device 250, and/or contract status platforms 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by second smart contract.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
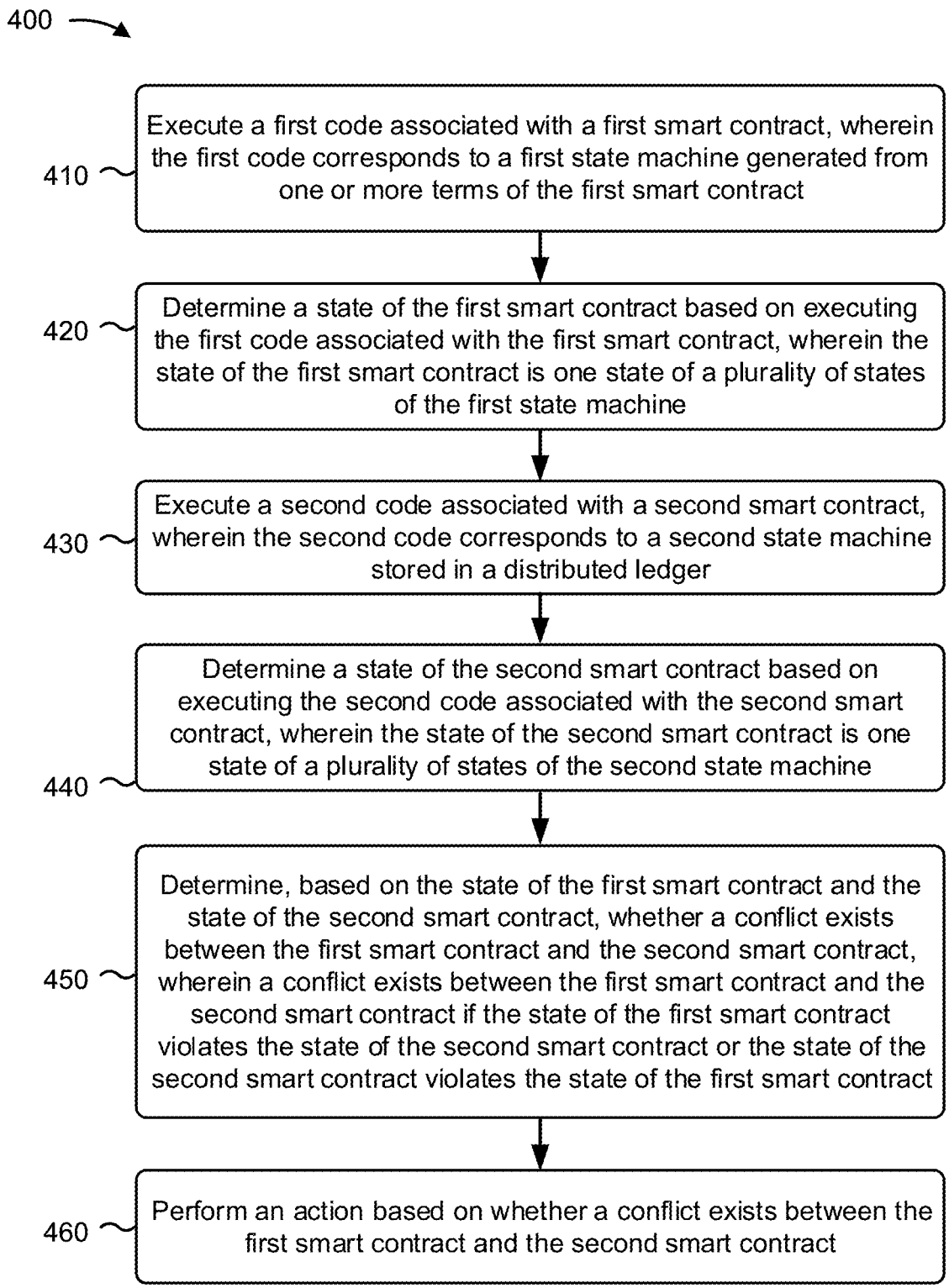

FIG. 4 is a flow chart of an example process 400 associated with smart contract regulation. In some implementations, one or more process blocks of FIG. 4 may be performed by a contract regulation platform (e.g., contract regulation platform 230). In some implementations, one or more process blocks of FIG. 4 may be performed by another device or a group of devices separate from or including the contract regulation platform, such as a node (e.g., node 210), a user device (e.g., user device 220), a computing resource (e.g., computing resource 235), a data storage device (e.g., data storage device 250), and one or more contract status platforms (e.g., contract status platforms 260).

As shown in FIG. 4, process 400 may include executing a first code associated with a first smart contract, wherein the first code corresponds to a first state machine generated from one or more terms of the first smart contract (block 410). For example, the contract regulation platform (e.g., using process 320, memory 330, storage component 340, input component 350, output component 360, communication interface 370, and/or the like) may execute a first code associated with a first smart contract, as described above. In some implementations, the first code corresponds to a first state machine generated from one or more terms of the first smart contract.

As further shown in FIG. 4, process 400 may include determining a state of the first smart contract based on executing the first code associated with the first smart contract, wherein the state of the first smart contract is one state of a plurality of states of the first state machine (block 420). For example, the contract regulation platform (e.g., using process 320, memory 330, storage component 340, input component 350, output component 360, communication interface 370, and/or the like) may determine a state of the first smart contract based on executing the first code associated with the first smart contract, as described above. In some implementations, the state of the first smart contract is one state of a plurality of states of the first state machine.

As further shown in FIG. 4, process 400 may include executing a second code associated with a second smart contract, wherein the second code corresponds to a second state machine stored in a distributed ledger (block 430). For example, the contract regulation platform (e.g., using process 320, memory 330, storage component 340, input component 350, output component 360, communication interface 370, and/or the like) may execute a second code associated with a second smart contract, as described above. In some implementations, the second code corresponds to a second state machine stored in a distributed ledger.

As further shown in FIG. 4, process 400 may include determining a state of the second smart contract based on executing the second code associated with the second smart contract, wherein the state of the second smart contract is one state of a plurality of states of the second state machine (block 440). For example, the contract regulation platform (e.g., using process 320, memory 330, storage component 340, input component 350, output component 360, communication interface 370, and/or the like) may determine a state of the second smart contract based on executing the second code associated with the second smart contract, as described above. In some implementations, the state of the second smart contract is one state of a plurality of states of the second state machine.

As further shown in FIG. 4, process 400 may include determining, based on the state of the first smart contract and the state of the second smart contract, whether a conflict exists between the first smart contract and the second smart contract, wherein a conflict exists between the first smart contract and the second smart contract if the state of the first smart contract violates the state of the second smart contract or the state of the second smart contract violates the state of the first smart contract (block 450). For example, the contract regulation platform (e.g., using process 320, memory 330, storage component 340, input component 350, output component 360, communication interface 370, and/or the like) may determine, based on the state of the first smart contract and the state of the second smart contract, whether a conflict exists between the first smart contract and the second smart contract, as described above. In some implementations, a conflict exists between the first smart contract and the second smart contract if the state of the first smart contract violates the state of the second smart contract or the state of the second smart contract violates the state of the first smart contract.

As further shown in FIG. 4, process 400 may include performing an action based on whether a conflict exists between the first smart contract and the second smart contract (block 460). For example, the contract regulation platform (e.g., using process 320, memory 330, storage component 340, input component 350, output component 360, communication interface 370, and/or the like) may perform an action based on whether a conflict exists between the first smart contract and the second smart contract, as described above.

Process 400 may include additional aspects, such as any single aspect or any combination of aspects described below and/or in connection with one or more other processes described elsewhere herein.

In some implementations, the contract regulation platform may receive a document associated with a contract, analyze, using a natural language processing model, the contract to identify one or more terms of the contract, and generate the first smart contract based on the one or more terms of the contract.

In some implementations, the distributed ledger comprises a publicly available distributed ledger. In some implementations, the publicly available distributed ledger allows access to the second smart contract to any entity that has access to the distributed ledger.

In some implementations, the distributed ledger is associated with an entity. In some implementations, only authorized users associated with the entity have access to the distributed ledger.

In some implementations, the distributed ledger comprises a blockchain. In some implementations, the second smart contract is stored in a first block of the blockchain. In some implementations, the contract regulation platform, when performing the action, may store the first smart contract in a second block of the blockchain regardless of whether a conflict exists between the first smart contract and the second smart contract.

In some implementations, the state of the first smart contract corresponds to a potential state of the first smart contract, or a potential state of the first smart contract. In some implementations, the state of the second smart contract corresponds to a current state of the second smart contract, or a potential state of the second smart contract.

In some implementations, the state of the first smart contract is defined based on a first condition and a variable. In some implementations, the first condition causes, based on the variable, the first smart contract to be compliant or not compliant. In some implementations, the state of the second smart contract is defined based on a second condition and the variable, and the second condition causes, based on the variable, the second smart contract to be compliant or not compliant.

In some implementations, when a conflict exists between the first smart contract and the second smart contract, the contract regulation platform, when performing the action, may store the first smart contract in the distributed ledger, monitor the state of the first smart contract to determine whether the conflict continues to exist, and prevent any transactions associated with the first smart contract until the state of the first smart contract causes the conflict to not exist.

In some implementations, when a conflict exists between the first smart contract and the second smart contract, the contract regulation platform, when performing the action, may store the first smart contract in the distributed ledger, append a flag to the first smart contract, and append the flag to the second smart contract. In some implementations, the flag indicates that the conflict exists between the first smart contract and the second smart contract.

In some implementations, the contract regulation platform, after determining that the conflict exists between the first smart contract and the second smart contract, may determine that the conflict no longer exists between the first smart contract and the second smart contract based on at least one of a change in the state of the first smart contract, or a change in the state of the second smart contract; and remove the flag from the first smart contract and the second smart contract based on determining that the conflict no longer exists between the first smart contract and the second smart contract.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 associated with smart contract regulation. In some implementations, one or more process blocks of FIG. 5 may be performed by a contract regulation platform (e.g., contract regulation platform 230). In some implementations, one or more process blocks of FIG. 5 may be performed by another device or a group of devices separate from or including the contract regulation platform, such as a node (e.g., node 210), a user device (e.g., user device 220), a computing resource (e.g., computing resource 235), a data storage device (e.g., data storage device 250), and contract status platforms (e.g., contract status platforms 260).

As shown in FIG. 5, process 500 may include determining a current state of a first smart contract, wherein the current state of the first smart contract is defined based on a first condition and a variable, wherein the first condition causes, based on the variable, the first smart contract to be compliant or not compliant (block 510). For example, the contract regulation platform (e.g., using process 320, memory 330, storage component 340, input component 350, output component 360, communication interface 370, and/or the like) may determine a current state of a first smart contract, as described above. In some implementations, the current state of the first smart contract is defined based on a first condition and a variable. In some implementations, the first condition causes, based on the variable, the first smart contract to be compliant or not compliant.

As further shown in FIG. 5, process 500 may include determining, based on determining the current state of the first smart contract, a current state of a second smart contract, wherein the second smart contract is one of a plurality of smart contracts in a distributed ledger, and wherein the current state of the second smart contract is determined based on a second condition and the variable, wherein the second condition causes the second smart contract to be compliant or not compliant based on the variable (block 520). For example, the contract regulation platform (e.g., using process 320, memory 330, storage component 340, input component 350, output component 360, communication interface 370, and/or the like) may determine, based on determining the current state of the first smart contract, a current state of a second smart contract, as described above. In some implementations, the second smart contract is one of a plurality of smart contracts in a distributed ledger. In some implementations, the current state of the second smart contract is defined based on a second condition and the variable. In some implementations, the second condition causes the second smart contract to be compliant or not compliant based on the variable.

As further shown in FIG. 5, process 500 may include determining, based on the current state of the first smart contract and the current state of the second smart contract, whether the first smart contract conflicts with the second smart contract, wherein the first smart contract conflicts with the second smart contract when the variable causes the first smart contract to be compliant based on the first condition and the second smart contract to not be compliant based on the second condition, or wherein the first smart contract conflicts with the second smart contract when the variable causes the first smart contract to not be compliant based on the first condition and the second smart contract to be compliant based on the second condition (block 530). For example, the contract regulation platform (e.g., using process 320, memory 330, storage component 340, input component 350, output component 360, communication interface 370, and/or the like) may determine, based on the current state of the first smart contract and the current state of the second smart contract, whether the first smart contract conflicts with the second smart contract, as described above. In some implementations, the first smart contract conflicts with the second smart contract when the variable causes the first smart contract to be compliant based on the first condition and the second smart contract to not be compliant based on the second condition. In some implementations, the first smart contract conflicts with the second smart contract when the variable causes the first smart contract to not be compliant based on the first condition and the second smart contract to be compliant based on the second condition.

As shown in FIG. 5, process 500 may include performing an action based on whether the first smart contract conflicts with the second smart contract (block 540). For example, the contract regulation platform (e.g., using process 320, memory 330, storage component 340, input component 350, output component 360, communication interface 370, and/or the like) may perform an action based on whether the first smart contract conflicts with the second smart contract.

Process 500 may include additional aspects, such as any single aspect or any combination of aspects described below and/or in connection with one or more other processes described elsewhere herein.

In some implementations, the contract regulation platform may determine respective current states of each of the plurality of smart contracts. In some implementations, the respective current states of each of the plurality of smart contracts is defined based on respective conditions of the plurality of smart contracts and the variable. In some implementations, the contract regulation platform may determine, based on the current state of the first smart contract and the respective current states of each of the plurality of smart contracts, that the first smart contract conflicts with one of the plurality of smart contracts. In some implementations, the contract regulation platform, when performing the action, may store the first smart contract in the distributed ledger, generate a flag associated with the first smart contract being in conflict with the one of the plurality of smart contracts, and store the flag in a data structure associated with the distributed ledger.

In some implementations, the contract regulation platform, after determining that the first smart contract conflicts with the one of the plurality of smart contracts, may monitor a subsequent state of the first smart contract, determine that the first smart contract does not conflict with any of the plurality of smart contracts, and perform an action associated with the first smart contract based on determining that the first smart contract does not conflict with any of the plurality of smart contracts.

In some implementations, when the first smart contract conflicts with the second smart contract, the contract regulation platform, when performing the action, may refrain from storing the first smart contract in the distributed ledger based on the first smart contract conflicting with the second smart contract.

In some implementations, when no conflict exists between the first smart contract and the second smart contract, the contract regulation platform may store the first smart contract in the distributed ledger based on no conflict existing between the first smart contract and the second smart contract.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
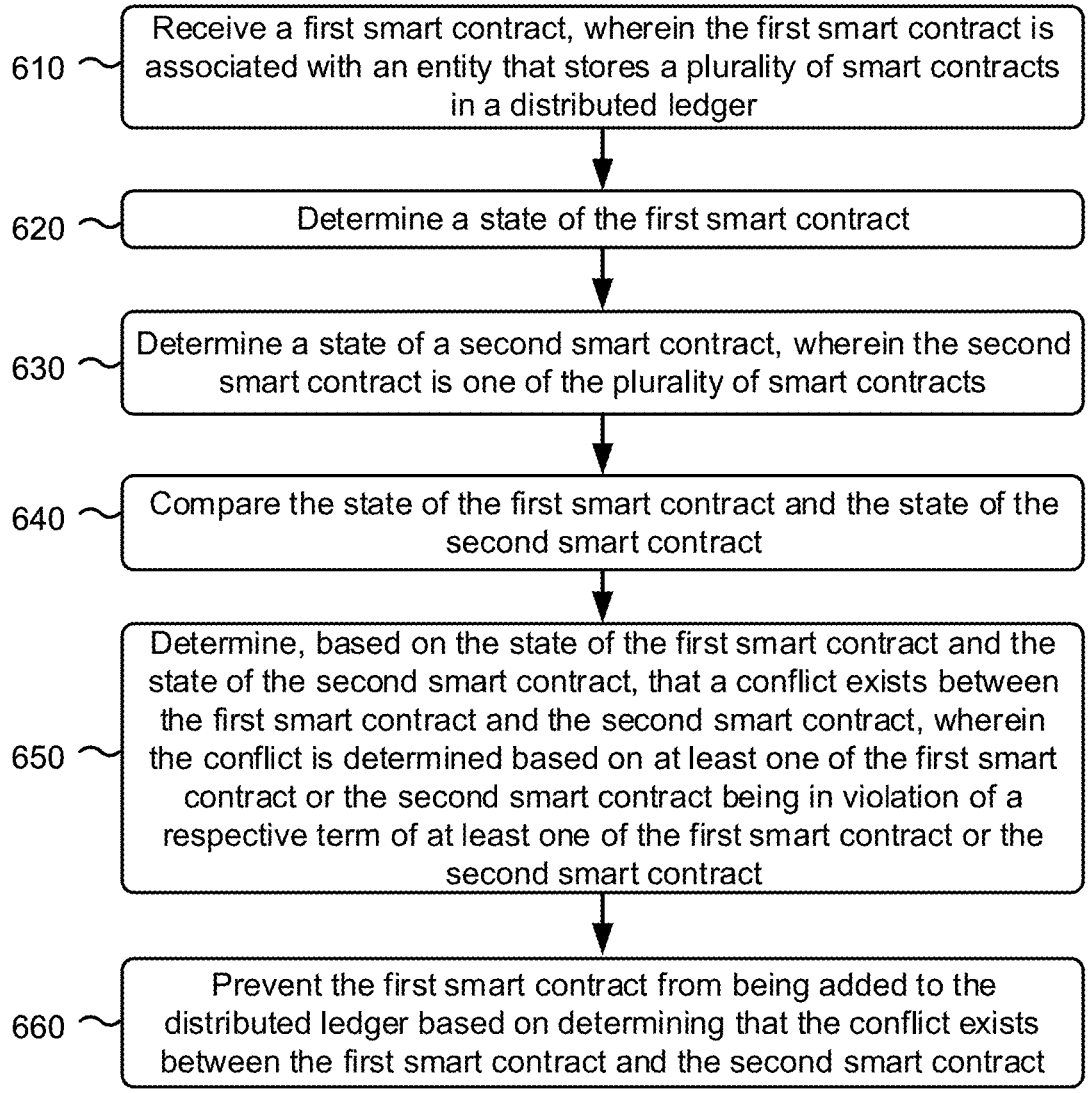

FIG. 6 is a flow chart of an example process 600 associated with smart contract regulation. In some implementations, one or more process blocks of FIG. 6 may be performed by a contract regulation platform (e.g., contract regulation platform 230). In some implementations, one or more process blocks of FIG. 6 may be performed by another device or a group of devices separate from or including the contract regulation platform, such as a node (e.g., node 210), a user device (e.g., user device 220), a computing resource (e.g., computing resource 235), a data storage device (e.g., data storage device 250), and contract status platforms (e.g., contract status platforms 260).

As shown in FIG. 6, process 600 may include receiving a first smart contract, wherein the first smart contract is associated with an entity that stores a plurality of smart contracts in a distributed ledger (block 610). For example, the contract regulation platform (e.g., using process 320, memory 330, storage component 340, input component 350, output component 360, communication interface 370, and/or the like) may receive a first smart contract, as described above. In some implementations, the first smart contract is associated with an entity that stores a plurality of smart contracts in a distributed ledger.

As shown in FIG. 6, process 600 may include determining a state of the first smart contract (block 620). For example, the contract regulation platform (e.g., using process 320, memory 330, storage component 340, input component 350, output component 360, communication interface 370, and/or the like) may determine a state of the first smart contract, as described above.

As shown in FIG. 6, process 600 may include determining a state of a second smart contract, wherein the second smart contract is one of the plurality of smart contracts (block 630). For example, the contract regulation platform (e.g., using process 320, memory 330, storage component 340, input component 350, output component 360, communication interface 370, and/or the like) may determine a state of a second smart contract, as described above. In some implementations, the second smart contract is one of the plurality of smart contracts.

As shown in FIG. 6, process 600 may include comparing the state of the first smart contract and the state of the second smart contract (block 640). For example, the contract regulation platform (e.g., using process 320, memory 330, storage component 340, input component 350, output component 360, communication interface 370, and/or the like) may compare the state of the first smart contract and the state of the second smart contract, as described above.

As shown in FIG. 6, process 600 may include determining, based on the state of the first smart contract and the state of the second smart contract, that a conflict exists between the first smart contract and the second smart contract, wherein the conflict is determined based on at least one of the first smart contract or the second smart contract being in violation of a respective term of at least one of the first smart contract or the second smart contract (block 650). For example, the contract regulation platform (e.g., using process 320, memory 330, storage component 340, input component 350, output component 360, communication interface 370, and/or the like) may determine, based on the state of the first smart contract and the state of the second smart contract, that a conflict exists between the first smart contract and the second smart contract, as described above. In some implementations, the conflict is determined based on at least one of the first smart contract or the second smart contract being in violation of a respective term of at least one of the first smart contract or the second smart contract.

As shown in FIG. 6, process 600 may include preventing the first smart contract from being added to the distributed ledger, based on determining that the conflict exists between the first smart contract and the second smart contract (block 660). For example, the contract regulation platform (e.g., using process 320, memory 330, storage component 340, input component 350, output component 360, communication interface 370, and/or the like) may prevent the first smart contract from being added to the distributed ledger based on determining that the conflict exists between the first smart contract and the second smart contract, as described above.

Process 600 may include additional aspects, such as any single aspect or any combination of aspects described below and/or in connection with one or more other processes described elsewhere herein.

In some implementations, the state of the first smart contract corresponds to the state of the second smart contract at a same moment in time. In some implementations, two entities involved in the first smart contract are the same as two entities involved in the second smart contract. In some implementations, the entity is associated with each one of the plurality of smart contracts in the distributed ledger.

In some implementations, the contract regulation platform may determine that the conflict no longer exists based on at least one of: the state of the first smart contract changing, or the state of the second smart contract changing; and store the first smart contract in the distributed ledger based on determining that the conflict no longer exists.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
generating, by a device, a first state machine defining a plurality of states of a first smart contract, based on at least one of:
variables associated with one or more terms of a first contract, or
conditions associated with the one or more terms of the first contract;

executing, by the device, a first code of the first smart contract by providing, to the first smart contract, first input,
  wherein the first code corresponds to the first state machine;
determining, by the device, a state of the first smart contract based on executing the first code,
  wherein the state of the first smart contract is one state of the plurality of states of the first smart contract;
identifying, by the device and based on an entity associated with the first smart contract, a second smart contract associated with the entity;
executing, by the device and based on identifying the second smart contract, a second code of the second smart contract by providing, to the second smart contract, at least a portion of the first input,
  wherein the second code corresponds to a second state machine stored in a distributed ledger;
determining, by the device, a state of the second smart contract based on executing the second code,
  wherein the state of the second smart contract is one state of a plurality of states of the second state machine;
determining, by the device and based on the state of the first smart contract and the state of the second smart contract, whether a conflict exists between the first smart contract and the second smart contract,
  wherein the conflict exists between the first smart contract and the second smart contract if the state of the first smart contract violates the state of the second smart contract or the state of the second smart contract violates the state of the first smart contract; and
performing, by the device, an action based on whether the conflict exists between the first smart contract and the second smart contract.

2. The method of claim 1, further comprising:
receiving a document associated with the first contract; and
analyzing, using a natural language processing model, the first contract to identify the one or more terms of the first contract.

3. The method of claim 1, wherein the distributed ledger comprises a publicly available distributed ledger,
  wherein the publicly available distributed ledger allows access to the second smart contract to any entity that has access to the distributed ledger.

4. The method of claim 1, wherein the distributed ledger is associated with an authorization entity, and
  wherein only authorized users associated with the authorization entity have access to the distributed ledger.

5. The method of claim 1, wherein the distributed ledger comprises a blockchain,
  wherein the second smart contract is stored in a first block of the blockchain, and
  wherein performing the action comprises:
    storing the first smart contract in a second block of the blockchain regardless of whether the conflict exists between the first smart contract and the second smart contract.

6. The method of claim 1, wherein the state of the first smart contract corresponds to:
  a current state of the first smart contract, or
  a potential state of the first smart contract, and
  wherein the state of the second smart contract corresponds to:
    a current state of the second smart contract, or
    a potential state of the second smart contract.

7. The method of claim 1, wherein the state of the first smart contract is defined based on a first condition and a variable,
  wherein the first condition causes, based on the variable, the first smart contract to be compliant or not compliant, or
  wherein the state of the second smart contract is defined based on a second condition and the variable,
    wherein the second condition causes, based on the variable, the second smart contract to be compliant or not compliant.

8. The method of claim 1, wherein, when the conflict exists between the first smart contract and the second smart contract, performing the action comprises:
  storing the first smart contract in the distributed ledger;
  monitoring the state of the first smart contract to determine whether the conflict continues to exist; and
  preventing any transactions associated with the first smart contract until the state of the first smart contract causes the conflict to not exist.

9. The method of claim 1, wherein, when the conflict exists between the first smart contract and the second smart contract, performing the action comprises:
  storing the first smart contract in the distributed ledger;
  appending a flag to the first smart contract; and
  appending the flag to the second smart contract,
    wherein the flag indicates that the conflict exists between the first smart contract and the second smart contract.

10. The method of claim 9, further comprising:
after determining that the conflict exists between the first smart contract and the second smart contract, determining that the conflict no longer exists between the first smart contract and the second smart contract based on at least one of:
  a change in the state of the first smart contract, or
  a change in the state of the second smart contract; and
removing the flag from the first smart contract and the second smart contract based on determining that the conflict no longer exists between the first smart contract and the second smart contract.

11. A device, comprising:
one or more memories; and
one or more processors, communicatively coupled to the one or more memories, to:
  generate a first state machine defining a plurality of states of a first smart contract, based on at least one of:
    variables associated with one or more terms of a first contract, or
    conditions associated with the one or more terms of the first contract;
  execute a first code of the first smart contract by providing, to the first smart contract, first input,
    wherein the first code corresponds to the first state machine;
  determine a state of the first smart contract based on executing the first code,
    wherein the state of the first smart contract is one state of the plurality of states of the first smart contract;
  identify, based on an entity associated with the first smart contract, a second smart contract associated with the entity;

execute, based on identifying the second smart contract, a second code of the second smart contract by providing, to the second smart contract, at least a portion of the first input,
  wherein the second code corresponds to a second state machine stored in a distributed ledger;
determine a state of the second smart contract based on executing the second code,
  wherein the state of the second smart contract is one state of a plurality of states of the second state machine;
determine, based on the state of the first smart contract and the state of the second smart contract, whether a conflict exists between the first smart contract and the second smart contract,
  wherein the conflict exists between the first smart contract and the second smart contract if the state of the first smart contract violates the state of the second smart contract or the state of the second smart contract violates the state of the first smart contract; and
perform an action based on whether the conflict exists between the first smart contract and the second smart contract.

12. The device of claim 11, wherein the one or more processors are to:
  receive a document associated with the first contract; and
  analyze, using a natural language processing model, the first contract to identify the one or more terms of the first contract.

13. The device of claim 11, wherein the distributed ledger comprises a publicly available distributed ledger,
  wherein the publicly available distributed ledger allows access to the second smart contract to any entity that has access to the distributed ledger.

14. The device of claim 11, wherein the distributed ledger is associated with an authorization entity, and
  wherein only authorized users associated with the authorization entity have access to the distributed ledger.

15. The device of claim 11, wherein the distributed ledger comprises a blockchain,
  wherein the second smart contract is stored in a first block of the blockchain, and
  wherein the one or more processors, when performing the action, are to:
    store the first smart contract in a second block of the blockchain regardless of whether the conflict exists between the first smart contract and the second smart contract.

16. A non-transitory computer-readable medium storing instructions, the instructions comprising:
  one or more instructions that, when executed by one or more processors, cause the one or more processors to:
    generate a first state machine defining a plurality of states of a first smart contract, based on at least one of:
      variables associated with one or more terms of a first contract, or
      conditions associated with the one or more terms of the first contract;
    execute a first code of the first smart contract by providing, to the first smart contract, first input,
      wherein the first code corresponds to the first state machine;
    determine a state of the first smart contract based on executing the first code,
      wherein the state of the first smart contract is one state of the plurality of states of the first smart contract;
    identify, based on an entity associated with the first smart contract, a second smart contract associated with the entity;
    execute, based on identifying the second smart contract, a second code of the second smart contract by providing, to the second smart contract, at least a portion of the first input,
      wherein the second code corresponds to a second state machine stored in a distributed ledger;
    determine a state of the second smart contract based on executing the second code,
      wherein the state of the second smart contract is one state of a plurality of states of the second state machine;
    determine, based on the state of the first smart contract and the state of the second smart contract, whether a conflict exists between the first smart contract and the second smart contract,
      wherein the conflict exists between the first smart contract and the second smart contract if the state of the first smart contract violates the state of the second smart contract or the state of the second smart contract violates the state of the first smart contract; and
    perform an action based on whether the conflict exists between the first smart contract and the second smart contract.

17. The non-transitory computer-readable medium of claim 16, wherein the state of the first smart contract corresponds to:
  a current state of the first smart contract, or
  a potential state of the first smart contract, and
  wherein the state of the second smart contract corresponds to:
    a current state of the second smart contract, or
    a potential state of the second smart contract.

18. The non-transitory computer-readable medium of claim 16, wherein the state of the first smart contract is defined based on a first condition and a variable,
  wherein the first condition causes, based on the variable, the first smart contract to be compliant or not compliant, or
  wherein the state of the second smart contract is defined based on a second condition and the variable,
    wherein the second condition causes, based on the variable, the second smart contract to be compliant or not compliant.

19. The non-transitory computer-readable medium of claim 16, wherein, when the conflict exists between the first smart contract and the second smart contract, the one or more instructions, when causing the one or more processors to perform the action, cause the one or more processors to:
  store the first smart contract in the distributed ledger;
  monitor the state of the first smart contract to determine whether the conflict continues to exist; and
  prevent any transactions associated with the first smart contract until the state of the first smart contract causes the conflict to not exist.

20. The non-transitory computer-readable medium of claim 16, wherein, when the conflict exists between the first smart contract and the second smart contract, the one or more instructions, when causing the one or more processors to perform the action, cause the one or more processors to:

store the first smart contract in the distributed ledger;
append a flag to the first smart contract; and
append the flag to the second smart contract,
   wherein the flag indicates that the conflict exists between the first smart contract and the second smart contract.

\* \* \* \* \*